US012651926B2

(12) United States Patent
  Ogedengbe et al.

(10) Patent No.: US 12,651,926 B2
(45) Date of Patent: Jun. 9, 2026

(54) SYSTEM AND METHODS FOR ENERGY MANAGEMENT. DESIGN, AND MONITORING OF RENEWABLE ENERGY SUPPLY IN A BUILDING ENVELOPE

(71) Applicant: Energhx Green Energy Corporation, Ottawa (CA)

(72) Inventors: Emmanuel O.B. Ogedengbe, Ottawa (CA); Darlington C. Nkwaze, Ottawa (CA)

(73) Assignee: Energhx Green Energy Corporation, Ottawa (CA)

( * ) Notice: Subject to any disclaimer, the term of this patent is extended or adjusted under 35 U.S.C. 154(b) by 0 days.

(21) Appl. No.: 18/431,695

(22) Filed: Feb. 2, 2024

(65) Prior Publication Data
  US 2024/0266866 A1    Aug. 8, 2024

Related U.S. Application Data

(60) Provisional application No. 63/442,838, filed on Feb. 2, 2023.

(51) Int. Cl.
| | |
|---|---|
| *H02J 13/00* | (2006.01) |
| *H02J 13/10* | (2026.01) |
| *H02J 101/24* | (2026.01) |
| *H02J 101/28* | (2026.01) |
| *H02J 103/30* | (2026.01) |
| *H02J 105/12* | (2026.01) |
| *H02J 105/52* | (2026.01) |

(52) U.S. Cl.
  CPC ........... *H02J 13/10* (2026.01); *H02J 2101/24* (2026.01); *H02J 2101/28* (2026.01); *H02J 2103/30* (2026.01); *H02J 2105/12* (2026.01); *H02J 2105/52* (2026.01)

(58) Field of Classification Search
  CPC ................................................. H02J 13/00001
  See application file for complete search history.

(56) References Cited

U.S. PATENT DOCUMENTS

| | | | |
|---|---|---|---|
| 8,990,340 B1 * | 3/2015 | Polis | ....................... H04L 67/02 709/217 |
| 2012/0166115 A1 * | 6/2012 | Apostolakis | ........... G06Q 50/06 702/62 |

(Continued)

OTHER PUBLICATIONS

Michael LeMay, Jason J. Haas, and Carl A. Gunter, Collaborative Recommender Systems for Building Automation, 2009, Proceedings of the 42nd Hawaii International Conference on System Sciences, pp. 1-10 (Year: 2009).*

*Primary Examiner* — Nathan L Laughlin

(57) ABSTRACT

An energy management system and method designed to analyze the energy consumption of a building or cluster of buildings is provided. The system includes a user device and a controller. The controller includes a building energy audit analysis level, an energy demand-supply management level, and a heat and mass balance simulation level. The system integrates energy consumer-type users, energy server-type users, and energy developer-type users on one single platform. The energy management system provides a single platform for the sustainable management of energy data, integrates the users, inputs energy data, analyzes the data, and outputs energy performance and energy efficiency data based on the analyzed data.

14 Claims, 34 Drawing Sheets

(56)                    References Cited

U.S. PATENT DOCUMENTS

| | | | |
|---|---|---|---|
| 2013/0085614 A1* | 4/2013 | Wenzel ................ | G05B 13/021 |
| | | | 700/277 |
| 2014/0324404 A1* | 10/2014 | de la Torre-Bueno ...................... | |
| | | | G06F 30/20 |
| | | | 703/6 |
| 2021/0383276 A1* | 12/2021 | Ramamurti ............ | G06N 3/006 |
| 2022/0393470 A1* | 12/2022 | Nakagawa ............. | F28D 20/00 |
| 2023/0152763 A1* | 5/2023 | Davis .................... | G05B 15/02 |
| | | | 700/275 |
| 2024/0110717 A1* | 4/2024 | Zhang ..................... | F24F 11/64 |

* cited by examiner

E)))ERGHX
Exergetic Design of Energy Systems

Log in

Email Address — 1106

Password — 1108

Forgot Password

Log in — 1110

New User?Create Password iOS

Skip

Discover ways to save energy and money while reducing your enviromental footprint.

Log in — 1102

Sign up — 1104

1202

Figure 12B:
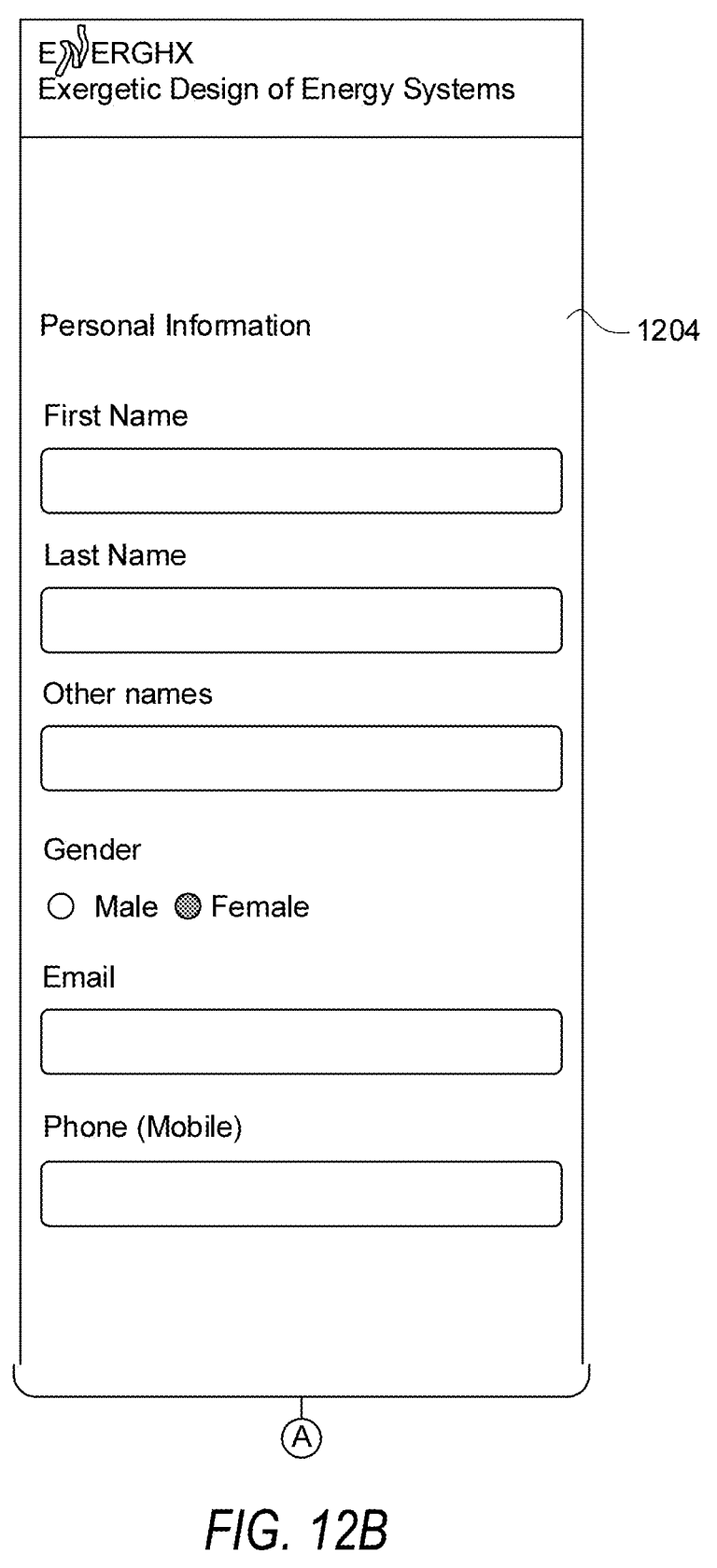

EX)ERGHX
Exergetic Design of Energy Systems

Personal Information                                    ~ 1204

First Name

[                                        ]

Last Name

[                                        ]

Other names

[                                        ]

Gender

○ Male  ◉ Female

Email

[                                        ]

Phone (Mobile)

Figure 12B:
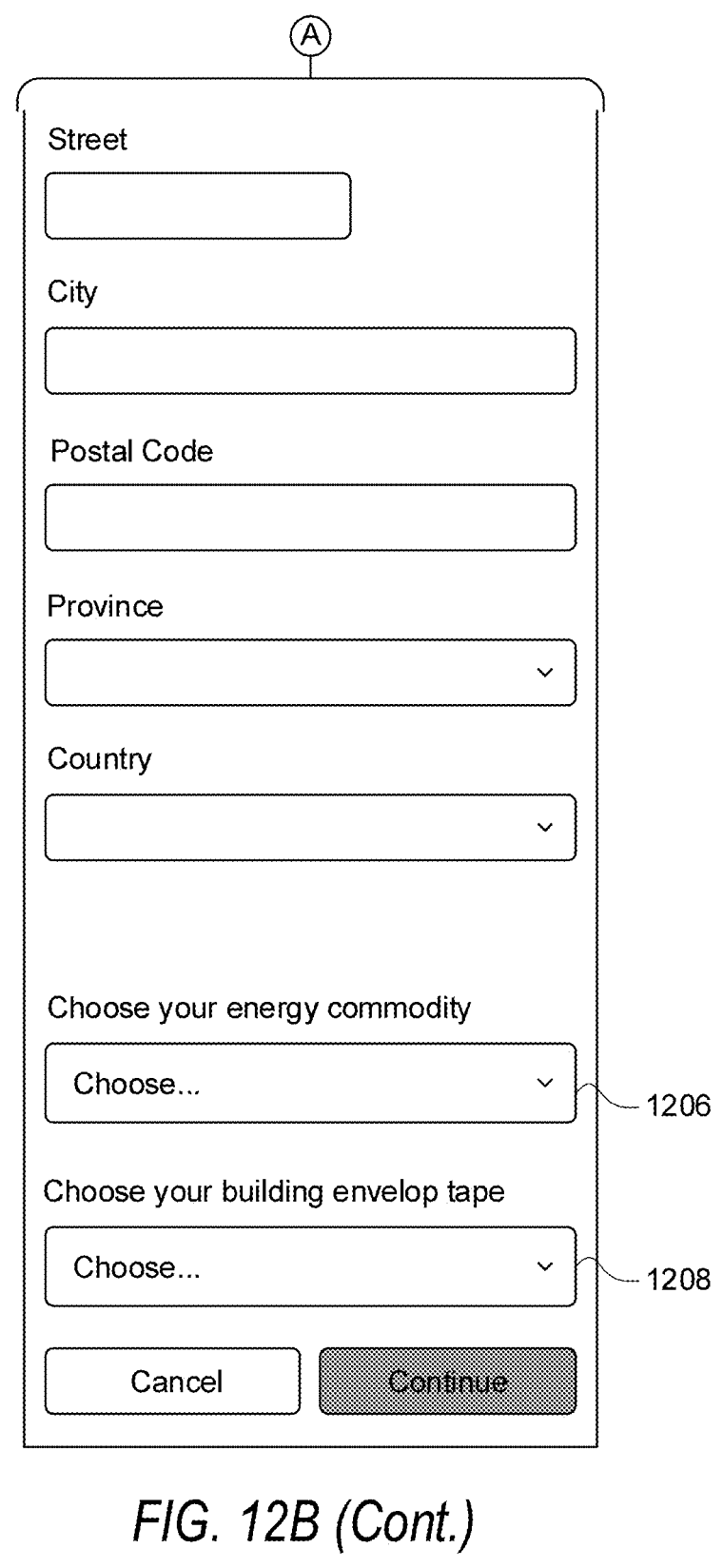

Street

City

Postal Code

Province

Country

Choose your energy commodity

Choose...          ⌄    — 1206

Choose your building envelop tape

Choose...          ⌄    — 1208

Cancel          Continue

Alternate phone:

Street address

Suite/Unit

City

Postal code

< Previous          Continue

FIG. 12E (Cont.)

Figure 13A:
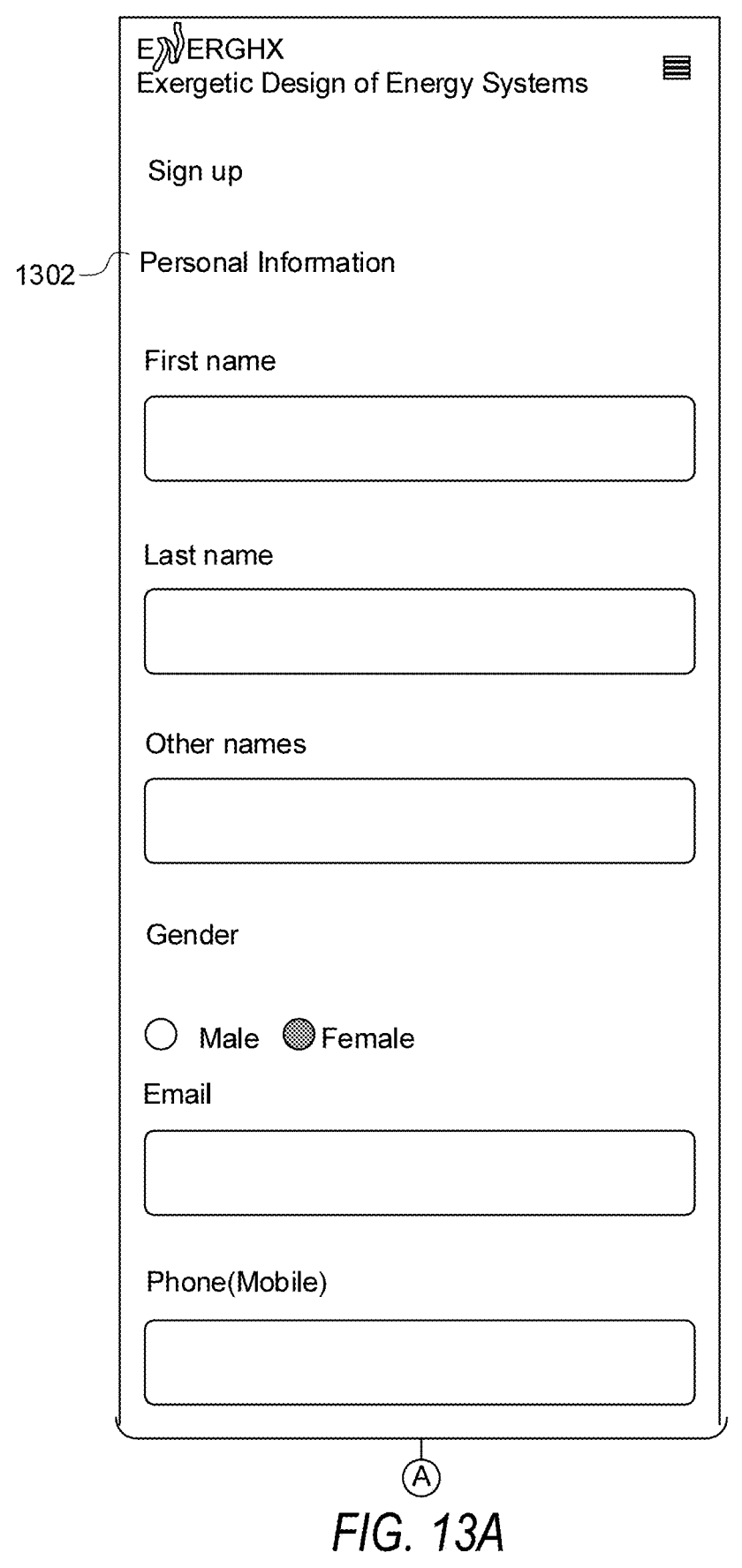

E))/ERGHX
Exergetic Design of Energy Systems

≡

Sign up

1302 — Personal Information

First name

Last name

Other names

Gender

◯ Male    ⬤ Female

Email

Phone(Mobile)

Figure 13A:
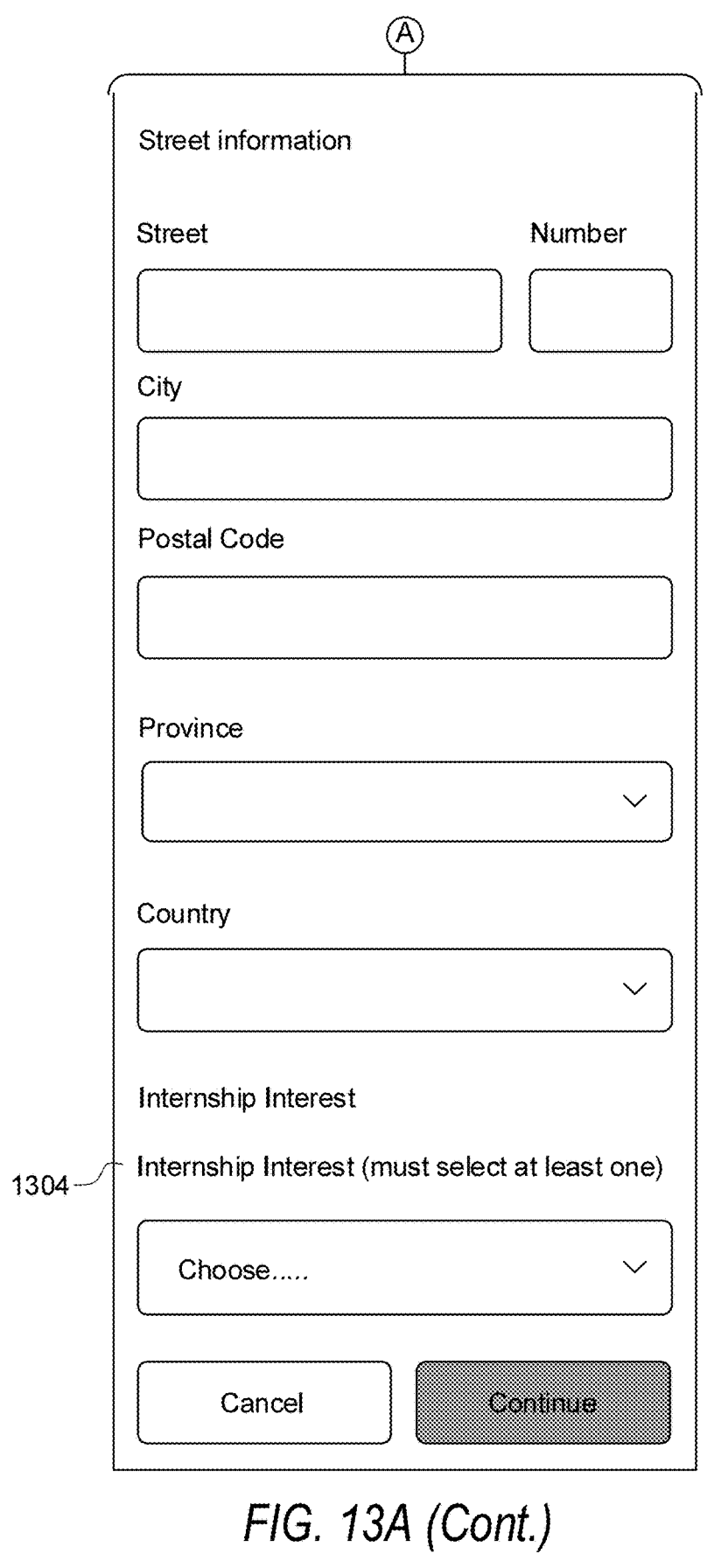

Street information

Street

Number

City

Postal Code

Province

Country

Internship Interest

Internship Interest (must select at least one)

1304

Choose.....

Cancel

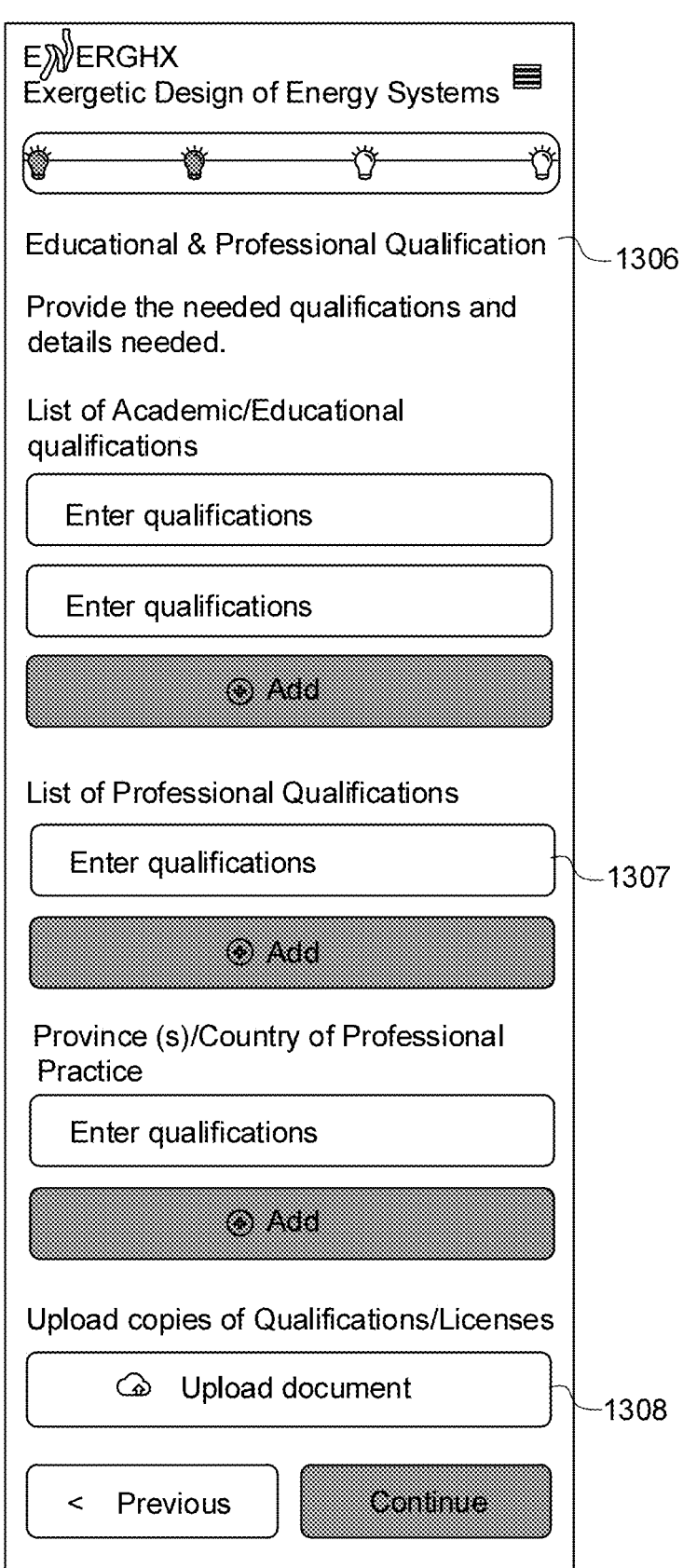

EXERGHX
Exergetic Design of Energy Systems

Educational & Professional Qualification ~1306

Provide the needed qualifications and details needed.

List of Academic/Educational qualifications

Enter qualifications

Enter qualifications

⊕ Add

List of Professional Qualifications

Enter qualifications ~1307

⊕ Add

Province (s)/Country of Professional Practice

Enter qualifications

⊕ Add

Upload copies of Qualifications/Licenses

☁ Upload document ~1308

< Previous          Continue

*FIG. 13B*

Figure 13D:
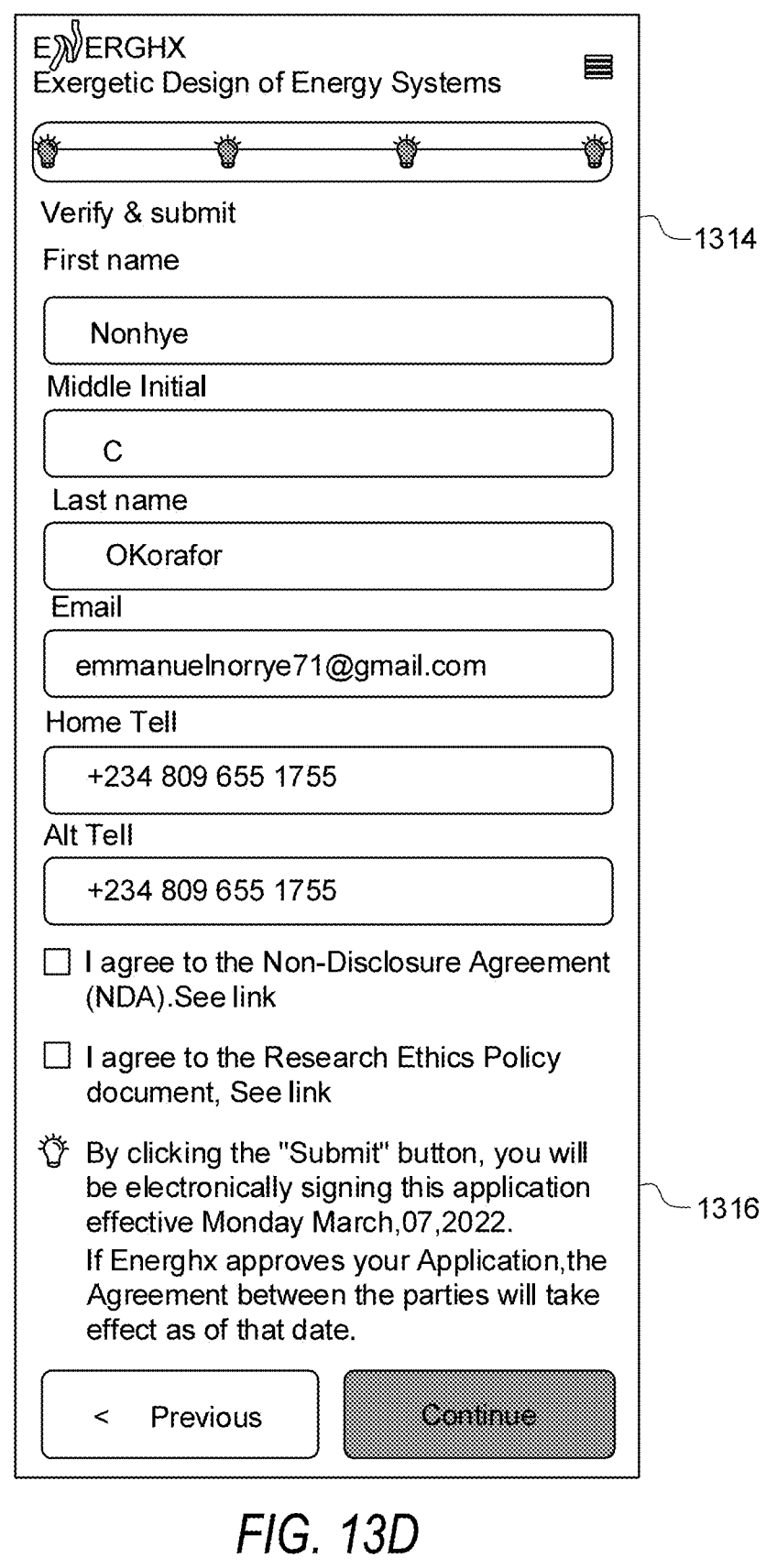

E))ERGHX
Exergetic Design of Energy Systems

Verify & submit

First name

Nonhye

Middle Initial

C

Last name

OKorafor

Email emmanuelnorrye71@gmail.com

Home Tell

+234 809 655 1755

Alt Tell

+234 809 655 1755

☐ I agree to the Non-Disclosure Agreement (NDA).See link

☐ I agree to the Research Ethics Policy document, See link

By clicking the "Submit" button, you will be electronically signing this application effective Monday March,07,2022.
If Energhx approves your Application,the Agreement between the parties will take effect as of that date.

1314

1316

< Previous      Continue

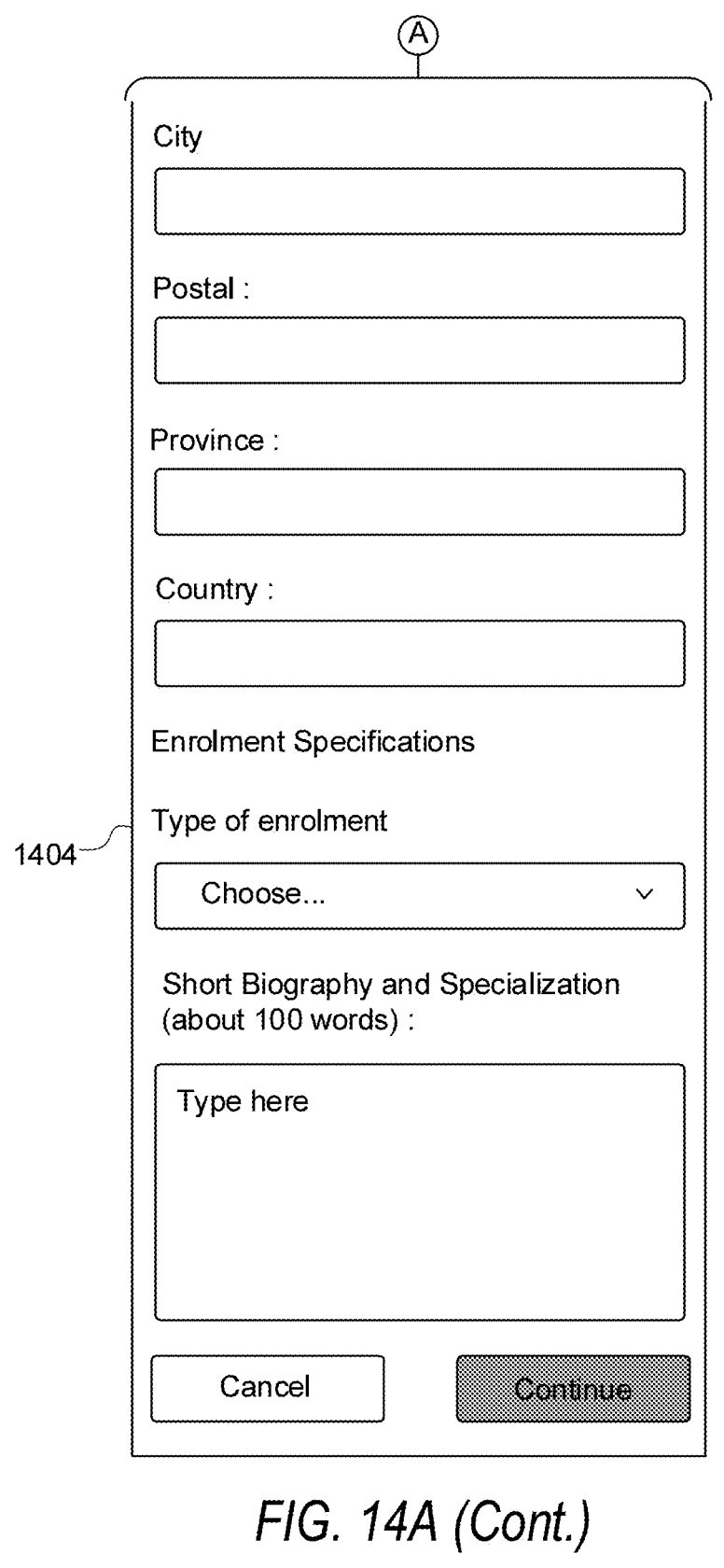

City

Postal :

Province :

Country :

Enrolment Specifications

Type of enrolment

1404

Choose... ∨

Short Biography and Specialization
(about 100 words) :

Type here

Cancel        Continue

*FIG. 14A (Cont.)*

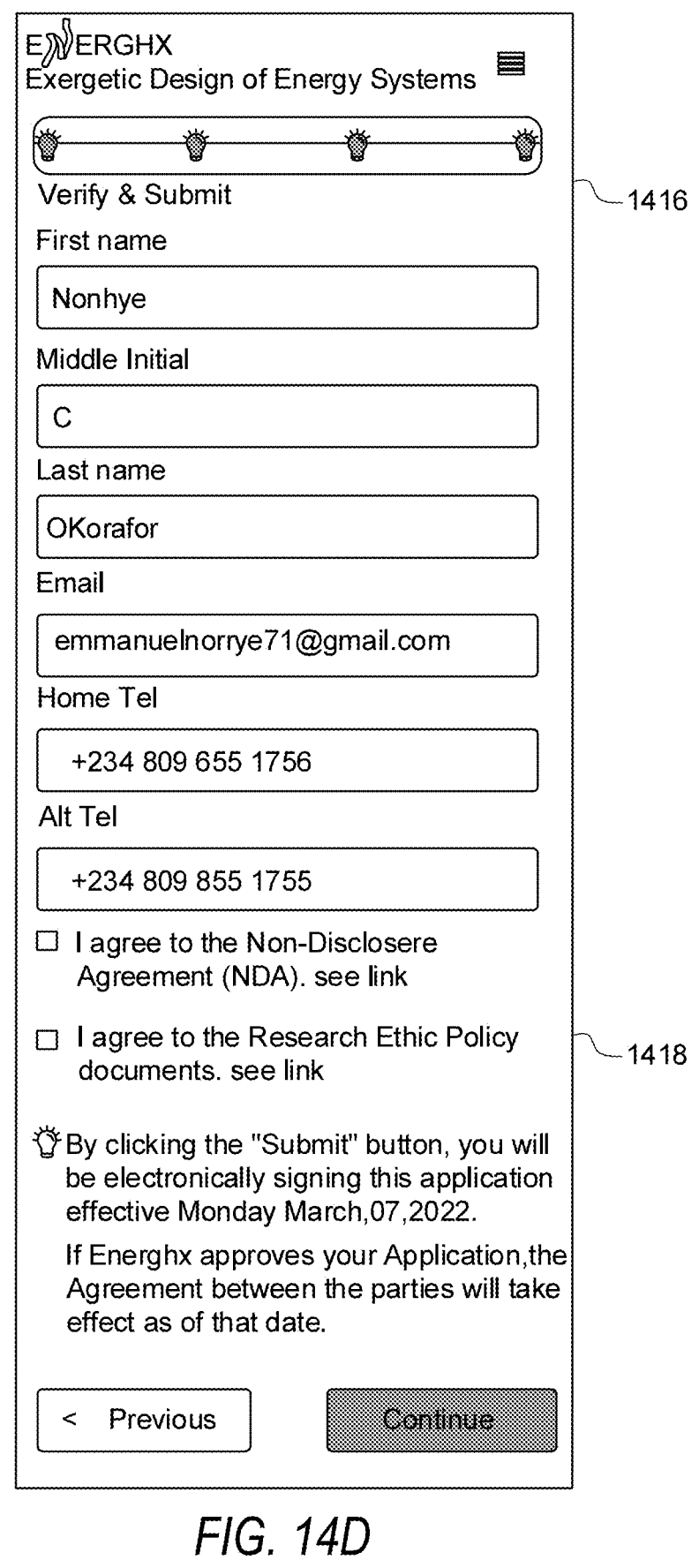

E)))ERGHX
Exergetic Design of Energy Systems ≡

Verify & Submit                        —1416

First name

> Nonhye

Middle Initial

> C

Last name

> OKorafor

Email

> emmanuelnorrye71@gmail.com

Home Tel

> +234 809 655 1756

Alt Tel

> +234 809 855 1755

☐ I agree to the Non-Disclosere
Agreement (NDA). see link

☐ I agree to the Research Ethic Policy       —1418
documents. see link

💡 By clicking the "Submit" button, you will
be electronically signing this application
effective Monday March,07,2022.

If Energhx approves your Application,the
Agreement between the parties will take
effect as of that date.

[ <   Previous ]      [ Continue ]

FIG. 14D

SYSTEM AND METHODS FOR ENERGY MANAGEMENT. DESIGN, AND MONITORING OF RENEWABLE ENERGY SUPPLY IN A BUILDING ENVELOPE

CROSS-REFERENCE TO RELATED APPLICATIONS

This application claims the benefit of U.S. Provisional Patent Application No. 63/442,838, filed Feb. 2, 2023, titled THERMAL COMFORT, INDOOR AIR QUALITY, AND NET-ZERO ENERGY MANAGEMENT the entire disclosure of which is incorporated herein by reference.

BACKGROUND

Energy regulations in various locations, such as with the Ontario Energy Board in the Province of Ontario, Canada, are being implemented. The energy regulations encourage the use of clean and renewable sources of energy, such as biomass, wind, and solar. Using clean and renewable sources of energy creates the potential for financial savings and better-managed household energy expenditures through a series of conservative measures.

Energy rate and consumption information of a residential or commercial building may be analyzed in an attempt to optimize energy efficiency. Typically, such energy analyses are completed with multiple solution platforms and further with multiple solution service providers. Existing systems lack efficiency. Accordingly, there is a need to provide an improved system and method for analyzing and optimizing energy consumption.

SUMMARY

An aspect of this disclosure pertains to an energy management system and method.

An energy management system designed to analyze the energy consumption of at least one building on a single platform is provided. The system may include a user device and a controller in communication with the user device. The controller may include a building energy audit and analysis level, an energy demand-supply management level, and a heat and mass balance simulation level. The system may integrate input from at least one of an energy consumer, an energy server, or an energy developer on the single platform.

In some aspects, the building energy audit and analysis level includes at least one of a future model, an appliance audit calculation, a cooling load calculation, an electric vehicle battery size, and an electric vehicle charging station. In some embodiments, the energy consumer utilizes the building energy audit and analysis level to upload personal information or building information to be analyzed by the system. In some aspects, the energy demand-supply management level includes at least one of energy management opportunities, a solar photovoltaic sizing, wind turbine sizing, and biomass plant sizing. In some embodiments, at least one of the energy server or the energy developer access the energy demand-supply management level for uploaded data to be analyzed by the system. In some aspects, the heat and mass balance simulation level includes at least one of a system design, a thermal comfort model, and an indoor air quality model. In some embodiments, at least one of the energy server or the energy developer accesses the heat and mass balance simulation level for uploaded data to be analyzed by the system. In some aspects, the system includes a user interface designed to enable at least one of the energy consumer, the energy server, and the energy developer to upload data to be analyzed by the system. In some aspects, the system comprises a result visualization produced by predetermined algorithms to provide a visual of a performance of the building. In some aspects, the system further includes a data aggregator for non-automated email service providers. In some aspects, the system includes a data storage system. In some embodiments, the data storage system obtains and stores data supplied by a user during enrollment. In some aspects, the system includes a recommendation engine to provide recommendations based on collaborative filtering of the information stored in the data storage system.

In another aspect, a system designed to manage a user's energy consumption on a single platform is provided. The system may include at least one system component provided in a form of at least one building, a user device designed to receive a user input of the user's energy consumption, and a controller provided in the form of a simulation manager designed to receive and process a data set received from the user device. In some aspects, the user device is in communication with the controller via a network.

In one aspect, the user device is provided in the form of a mobile phone having an application. In another embodiment, the system includes at least one of a user enrollment platform, a local distribution company, a data aggregator for non-automated email service provider, a data store, a user that is a service provider, a developer, or a consumer, a client dashboard, a data storage having stored data, and a recommendation engine. In some embodiments, the recommendation engine provides recommendations based on collaborative filtering of the stored data and expertise of the service provider. In some aspects, the data set includes at least one of a solar photovoltaic voltage, weather data, energy benchmark values, utility data of a specific energy system, graphic information system data, or building codes. In some embodiments, the controller is designed to process the data set through a QT software simulation engine algorithm and an audit software to provide a visualization of performance In another aspect, the output includes at least one of an energy benchmarking comparison, an energy conservation measure, a rating and certification, or a plurality of solar tracking specifications.

A method for monitoring, energy consumption of at least one building on a single platform with an energy management system is provided. The method can include providing the single platform for sustainable management of energy data, integrating at least three types of users on the single platform, inputting energy data from at least one of the three types of users about the at least one building into a user device, analyzing the energy data with a controller of the system, and outputting energy performance and energy efficiency data based on the analyzed data.

In some embodiments, the three types of users include an energy consumer user, an energy server user, and an energy developer user. In some aspects, the method includes inputting the data from the energy consumer user and inputting the data from a stored database. In some embodiments, the data from a stored database may include at least one of historical energy consumption data, building data, or energy appliance data. In some aspects, the data from the stored database further includes at least one of solar photovoltaic data, wind turbine data, biomass plant data, or heat and mass balance data. In some aspects, the method includes optimizing the data locally, wherein the optimization is performed by the single platform using a sequential least square programming algorithm. In some aspects, the method includes receiving energy conversion information input by the energy consumer user, analyzing the energy conversion information, and outputting performance and improved system efficiency data based on the analyzed energy conversion information.

DESCRIPTION OF THE DRAWINGS

FIGS. 12A-12G are illustrations of further interface graphics of the user device of FIG. 1;

FIGS. 13A-13E are illustrations of further interface graphics of the user device of FIG. 1; and FIGS. 14A-14E are illustrations of further interface graphics of the user device of FIG. 1.

DETAILED DESCRIPTION

Figure 1:
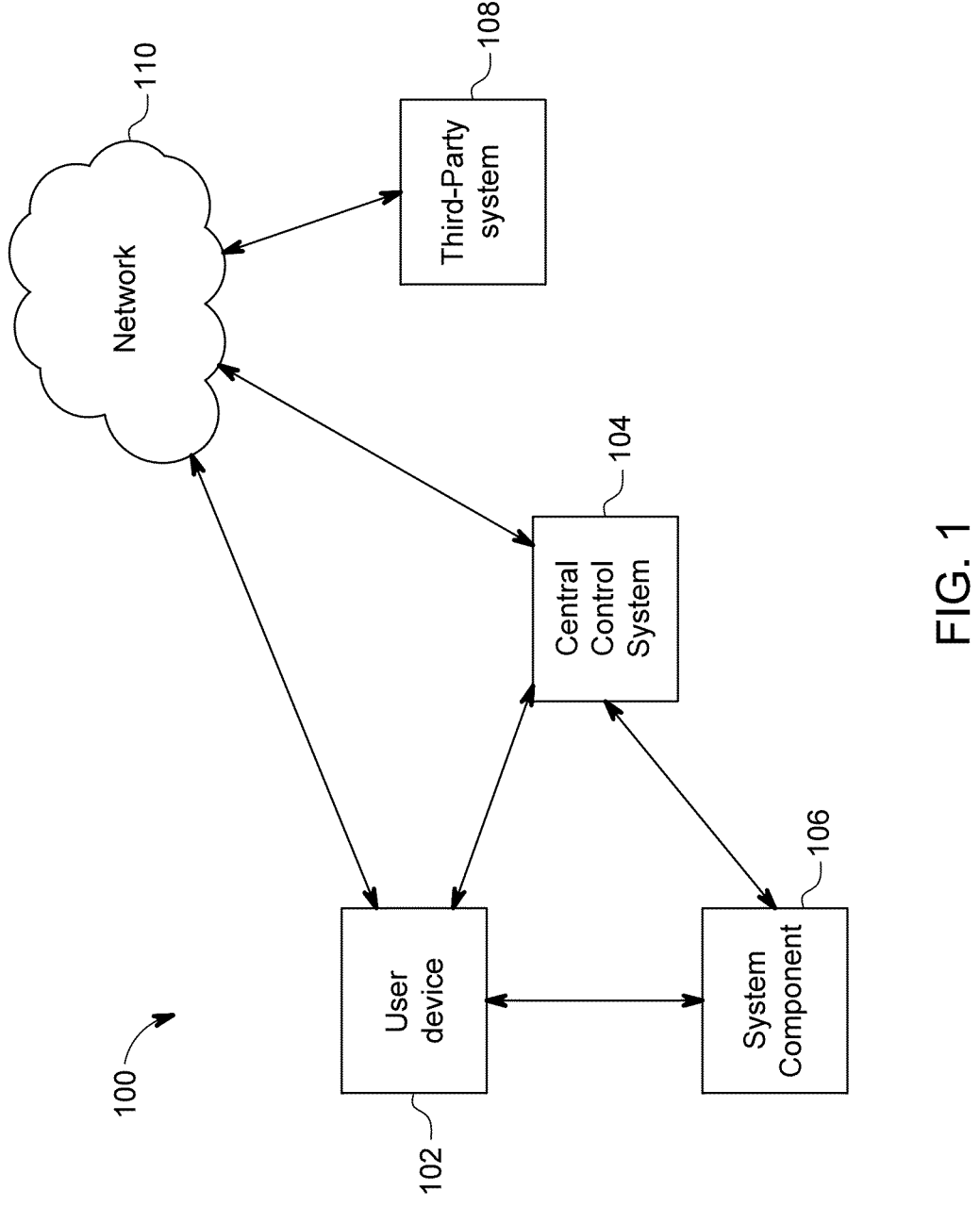
FIG. 1 is a block diagram of a connected energy management system having a user device according to disclosed embodiments.

Before any embodiments of the system are explained in detail, it is to be understood that the system is not limited in its application to the details of construction and the arrangement of components set forth in the following description or illustrated in the following drawings. The system is capable of other embodiments and of being practiced or of being carried out in several ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the system. Several modifications to the illustrated embodiments will be readily apparent to those skilled in the art, and the generic principles herein can be applied to other embodiments and applications without departing from embodiments of the system. Thus, embodiments of the system are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the system. Skilled artisans will recognize the examples provided herein have many useful alternatives and fall within the scope of embodiments of the system.

Methods, systems, and devices for monitoring, managing, and designing a user's energy consumption on a single platform towards a net-zero building is provided. The present invention enables energy users or consumers to monitor, manage, and design their energy consumption towards a net-zero building using a software application. The present disclosure may use various systems, such as EnerghxPlus™ (U.S. Trademark Serial No.: 77631160), to analyze a building or a plurality of buildings (e.g., a cluster of buildings or building envelope(s)). Various devices, including smart devices, may be used, and integrated with the methods and systems disclosed herein to further aid in the energy consumption analysis.

FIG. 1 illustrates an exemplary connected energy management system 100. It is understood that energy management system 100 can include, for example, a single supply service system with a fully embedded smart power grid system, or similar. The energy management system 100 can include one or more system components 106, a central controller 104, a user device 102, a third-party system 108, and a network 110. The connected energy management system 100 enables energy users or consumers to monitor, manage, and design their energy consumption towards a net-zero building using, for example, a software application. The connected energy management system 100 can provide advanced analytics for determining the energy consumption of one or more system components 106 of the connected energy management system 100 and facilitate the efficient deployment of service requests, data, or other information to address identified issues or implement corrective action. In one instance, such requests, data, or other information may be stored within the controller 104 and/or communicated via the network 110 to a third-party system 108 or a network 110.

In some instances, the controller 104 may be designed to automatically operate one or more system components 106 within the system 100. In some instances, the one or more system components 106 can include energy appliances, a building with many rooms (called a building envelope) or a plurality of buildings (e.g., a cluster of building envelopes). The system components 106 can be connected to the network 110 and can be controlled by the (e.g., central) controller 104 and/or the user device 102.

It is to be understood that the controller 104 disclosed herein can also receive and send instructions to other devices shown or not shown within the system 100. For example, the energy management system 100 disclosed herein can include one or more additional devices in communication with components of the system 100.

Figure 3:
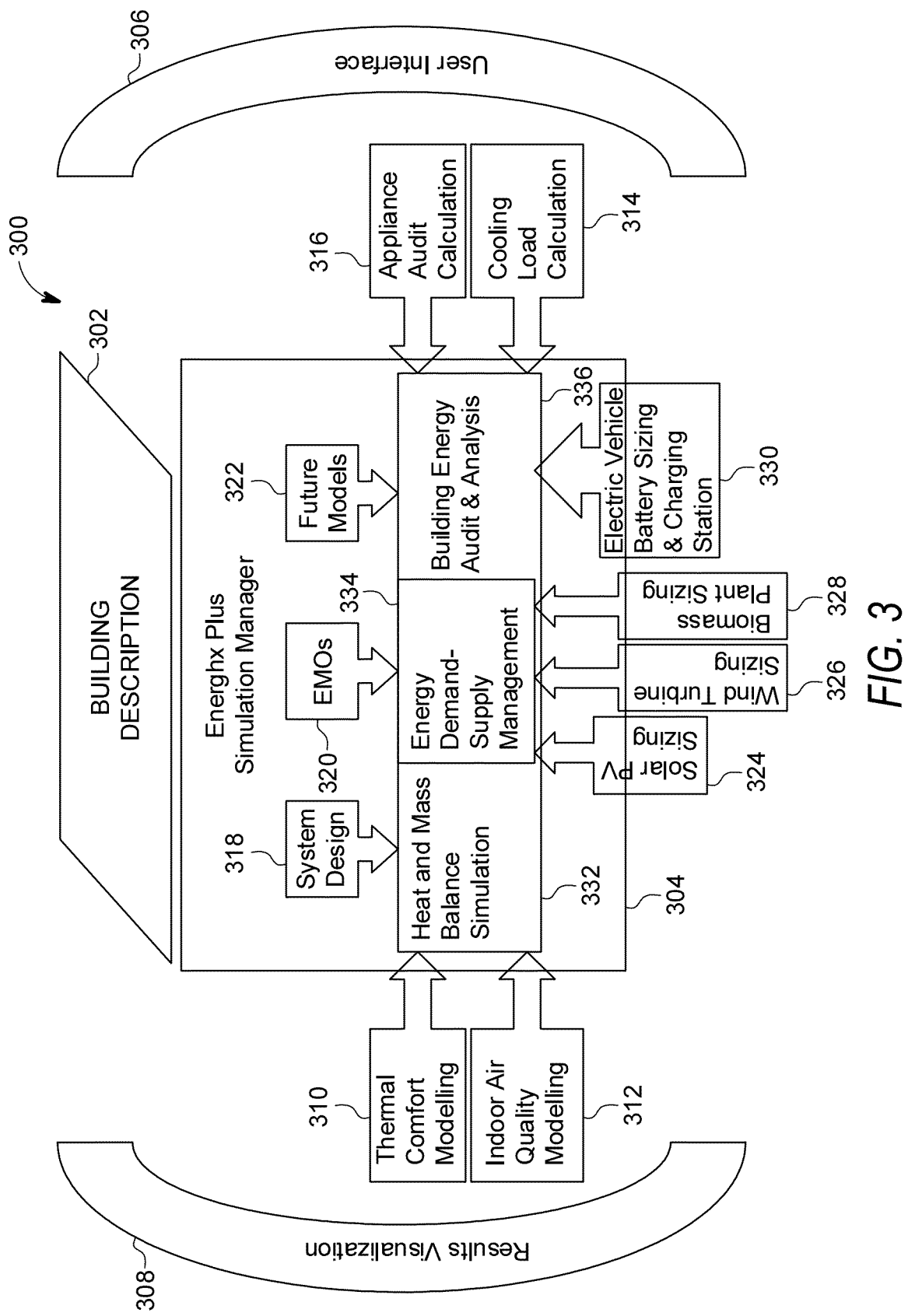
FIG. 3 is a block diagram of a simulation manager of the connected energy management system of FIG. 1.

The controller 104 also may include a simulation manager (as shown in FIG. 3) of the energy management system 100.

The controller 104 can be provided in the form of a data-processing device configured to transmit and receive data from the system 100. For example, the controller 104 may receive information at a receiver (not shown). A processor (not shown) included in the controller 104 may analyze the received data and determine instructions to be sent back to the system 100. A transmitter (not shown) of the controller 104 may send the instructions from the processor to one or more components of the system 100. The controller 104 can further include a memory (not shown). The memory can be configured to store data received from the system 100. The memory can be implemented as a stand-alone memory unit and/or as part of a processor included in the controller 104. Further, in one non-limiting instance, a network 110 may be coupled to the memory, which may include program instructions that are stored in the memory and executable by the processor to perform one or more of the methods described herein.

The network 110 can be provided in the form of a network interface, a local network, or other communication connection and is not limited to the plurality of communication connections. One skilled in the art will recognize that a communication connection can transmit and receive data using a plurality of communication protocols, including but not limited to wired, wireless, Bluetooth, cellular, satellite, GPS, RS-485, RF, MODBUS, CAN, CANBUS, DeviceNet, ControlNet, Ethernet TCP/IP, RS-232, Universal Serial Bus (USB), Firewire, Thread, proprietary protocol(s), or other communication protocol(s) as applicable. In some embodiments, the network 110 is located proximate to one or more components of the system 100. The network can include the Internet, intranets, extranets, wide area networks ("WANs"), local area networks ("LANs"), wired networks, wireless networks, cloud networks, or other suitable networks, or any combination of two or more networks, Ethernet networks, and other types of networks.

The network 110 may be configured to communicate directly or indirectly with a user device 102, such as a mobile phone having an application, a desktop computer, or a display. The user device 102 can be designed to receive a (e.g., user) input and communicate the user input to the controller 104 via the network 110.

Figure 2:
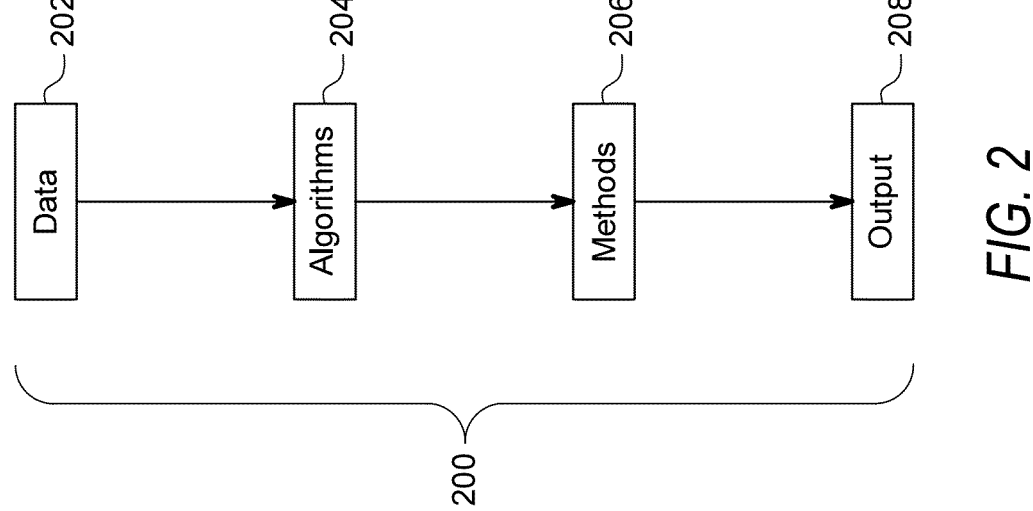
FIG. 2 is a flow diagram of a software architecture for a supply package of the connected energy management system of FIG. 1.

FIG. 2 illustrates a flow diagram of a software architecture for the supply package of the connected energy management system 100. The architecture may be stored by the user device 102, one or more system components 106, and/or the controller 104. The architecture may be, for example, EnerghxPlus™. The software architecture 200 may include data 202, algorithms 204, methods 206, and outputs 208. The data 202 may be collected from either a system component 106 or from a user through the user device 102, and from a third-party network or database or system 108 via the network 110. Data 202 may include but is not limited to, solar PV voltage, current and solar angles, weather, energy benchmark values, utility data of a specific energy system, graphic information systems, and/or building codes. The data 202 is then processed using at least one algorithm 204.

The algorithms 204 can be QT software simulation engines/application programming interface (API) used with an audit software to provide a visualization of the performance of a particular system component 106 being analyzed and to perform various methods 206.

The software architecture 200 can further include methods 206 including but not limited to life cycle cost analysis, light usage calculated by daily energy consumption, HVAC load calculation using the cooling load temperature difference, minimum energy performance standards, solar photovoltaic sizing using area and energy, biomass energy plant design and sizing, wind energy installation using numerical weather prediction and statistical methods, electric vehicle battery design, thermal comfort analysis, indoor air quality analysis, dual solar tracking design, light and cooling system optimization, electric vehicle charging station design, data collection and processing capacity expansion, and/or energy conversion and simulation. It can be appreciated that the methods 206 can be aggregated as the global optimization of energy stocks using the Sequential Least Squares Programming (SLSQP) algorithm.

The methods 206 facilitate the analysis and generate the output 208. The output 208 can include, for example, energy benchmark comparisons, energy conservation measures, and ratings and certificates for the system component 106 being analyzed, dual solar tracker specifications, optimum power output, and optimum power inclination angles.

FIG. 3 illustrates a simulation manager 300 and schematic for the connected energy management system 100. The simulation manager 300 may be stored by the controller 104 and/or the one or more user devices 102 of the energy management system 100. The simulation manager 300 provides navigation route and access level of users for a coordinated utilization of the capabilities of the energy management system. All users are constrained by the simulation manager 300 to access the connected energy management system 100 at the building energy audit and analysis level 336, including the cooling load calculation 314, appliance audit calculation 316, electric vehicle battery sizing and charging station 330, and future models 322. Through an optional upgrade by users, the simulation manager 300 enables users to access the energy demand-supply management level 334 and the heat and mass balance simulation level 332. There may be three distinct users (e.g., energy consumers, energy servers, and energy developers). Energy consumers may include, for example, any person looking to monitor, manage, and design their energy consumption on a single platform towards a net-zero building. The energy developers may include, for example, recent graduates, energy professionals, and consultants for research and development training on service delivery and the use of the service platform for service delivery. The energy servers may include, for example, HVAC specialists, builders, home inspectors, plumbers, renewable energy installers, electricians, plant engineers, and energy consultants as independent contractors and service providers.

Three categories of users may use the system 100. Energy consumer users (e.g., consumers of electricity, natural gas, and all utility-distributed fuels) use the platform for the purpose of their consumption of electricity and/or natural gas in a building or a cluster of building envelopes that the consumer did not generate. Consumers may utilize the energy management system to design and monitor energy consumption towards net-zero management. Energy developer users (e.g., energy research consultants, young professionals, or ambassadors-in-training) remotely redesign or redefine the usage of energy for the purpose of the consumer's energy usage. Finally, energy server users (e.g., builders, inspectors, electricians, plumbers, HVAC specialists, renewable energy technicians/technologists, plant engineers, service consultants, and/or engineers-in-training) provide on-site services towards efficient usage for the purpose of the consumer's energy usage. All three categories of users may interact or communicate on a single platform of the energy management supply service system. The use of the system promotes buildings with net-zero energy consumption, smart control of thermal comfort, and acceptable indoor air quality. As an example, Energhx may be a Service Provider, represented by two independent associates and classified as energy developers and energy servers. Whereas energy consumers are clients of Energhx.

The three users may have (e.g., three) levels of account management. The levels of account management can include but are not limited to, energy consumers at account level one 336, energy servers at account level two 334, and energy developers at account level two 334 and three 332.

Level one account management 336 includes the engagement of all activities relating to the building energy audit and analysis. Level one account management 336 may include future models 322, appliance audit calculations 316, cooling load calculations 314, and electric vehicle battery sizing and charging station analysis 330. The energy consumers at level one account management 336 may use the user interface 306 to supply their personal information, service address, types of energy commodities consumed, and the type of building envelopes for these energy commodities to an account center (not illustrated) for the building or building envelope 302 being analyzed.

Level two account management 334 includes the engagement of all activities relating to energy demand-supply management and the sizing of renewable energy system potentials of the buildings. Level two account management 334 may include solar photovoltaic sizing 324, wind turbine sizing 326, biomass plant sizing 328, and energy management opportunities 320. Energy servers and energy developers may use the user interface 306, which can be the interface of user device 102, to supply and/or access this data on the system 100. Level two account management 334 of the energy management system 100 allows access to the data and information supplied at level one account management 336.

Level three account management 332 includes the engagement of heat and mass balance simulation modules. Level three account management may include system design 318, thermal comfort modeling 310, and indoor air quality modeling 312. Energy developers may use the user interface 306 to supply and access this data on the system 100. Level three account management 332 of the energy management system 100 allows access to the data and information supplied and analyzed at level two account management 334 and level one account management 336.

Results visualization 308 are produced by predetermined algorithms 204, stored in the software architecture 200, to provide a visual of a performance of the building or cluster of buildings being analyzed by the energy management system 100. The results visualization may be displayed on the (e.g., dashboard of the) user device 102 and communicated periodically to energy consumers (e.g., through their email service), after the completion of at least energy audit 600. The results visualization may be produced by predetermined algorithms to provide a visual of a performance of the building in terms of zero-emission ratios (availability, accessibility, and affordability) of users, energy use intensity (EUI) of appliances, heat gain through the building envelope elements, lighting, building occupants, cooling loads, thermal comfort indices, and indoor air quality indices.

Figure 4:
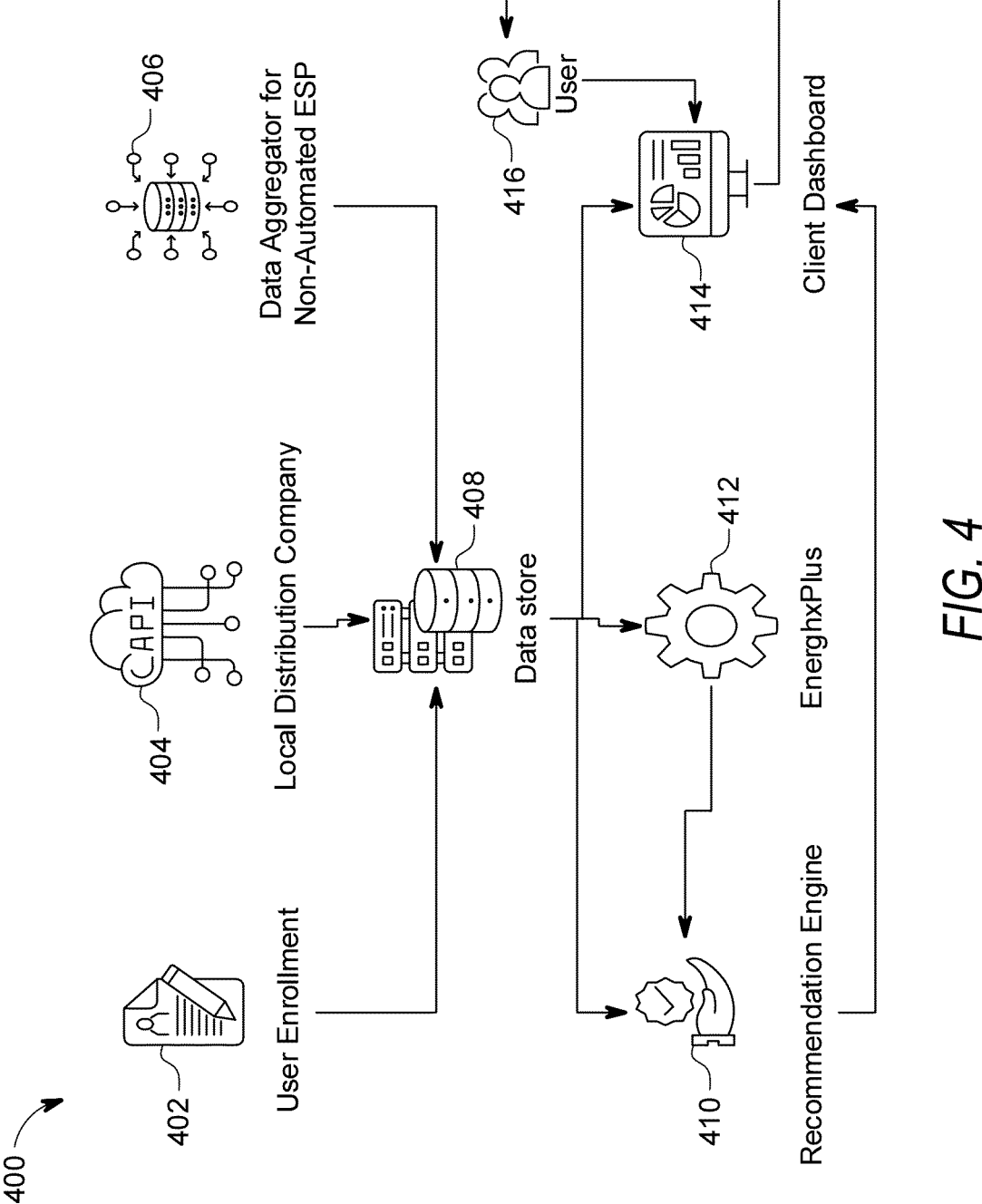
FIG. 4 is a flow diagram of a server-developer-consumer data architecture of the connected energy management system of FIG. 1.

FIG. 4 illustrates a flow diagram for the data structure 400 of the energy management system 100. The system 100 uses a server-developer-consumer (SDC) architecture for the integration of users with the energy management system 100. Within the data structure 400, at least one user (e.g., energy consumers, energy servers, and energy developers) may enroll via a user enrollment 402, which may be completed via a user device, such as the user device 102 or the user interface 306. The enrollment then can be communi-cated via the network 110 to a data storage 408 that may be contained in at least one of the system components 106 or the controller 104.

Moreover, the data structure 400 can include information 404 from a user, such as energy service providers or a local distribution company (LDC), that may be entered through API access, for example, and the information 404 can be communicated via the network 110 to the data storage 408. Further, information from a data aggregator 406 for a non-automated email service provider may be communi-cated via the network 110 to the data storage 408.

The data within the data storage 408 can be stored or communicated to the system 412 or the simulation manager 300, for example, the EnerghxPlus™. The system 412 may be designed to process the data and output an optimized recommendation to a recommendation engine 410. In some embodiments, the system 412 may use a format, such as Compressed Banded Data, for sparse banded matrices gen-erated by hybrid finite-element volume methods in numeri-cal heat transfer, capable of being used, but not limited to being used, for at least one of: calculating the wind loads on the renewable power systems; calculating the snow loads on the renewable power systems; calculating the effect of the snow accretion on the renewable power systems; calculating the thermal comfort and indoor air quality in a built envi-ronment; and/or calculating the energy harvest optimization based on the size, location, angles of inclination, and instal-lation methods for the renewable power systems. Moreover, in some instances, the data from the data storage 408 can be communicated (e.g., directly) to the client dashboard 414. In one instance, the client dashboard 414 can be the user device 102 and/or the user interface 306, where a user 416 may enter data (e.g., information) into the client dashboard 414. The client dashboard 414 can be an input for data and can also be an output for data.

Further, in some instances, rather than the data within the data storage 408 being communicated through the system 412 to the recommendation engine 410, the data within the data storage 408 can be communicated directly to the recommendation engine 410. The recommendation engine 410 is used to provide recommendations based on at least one of the collaborative filtering of the data from the data storage 408, a user-supplied building and occupant-behav-ioral data from the client dashboard 414, and the expertise or information entered into the system 400 from at least one user 416 (e.g., the energy servers, the energy developers, and/or the energy consumers). Additionally, the recommen-dation engine 410 can provide data to be output using the client dashboard 414.

Figure 5:
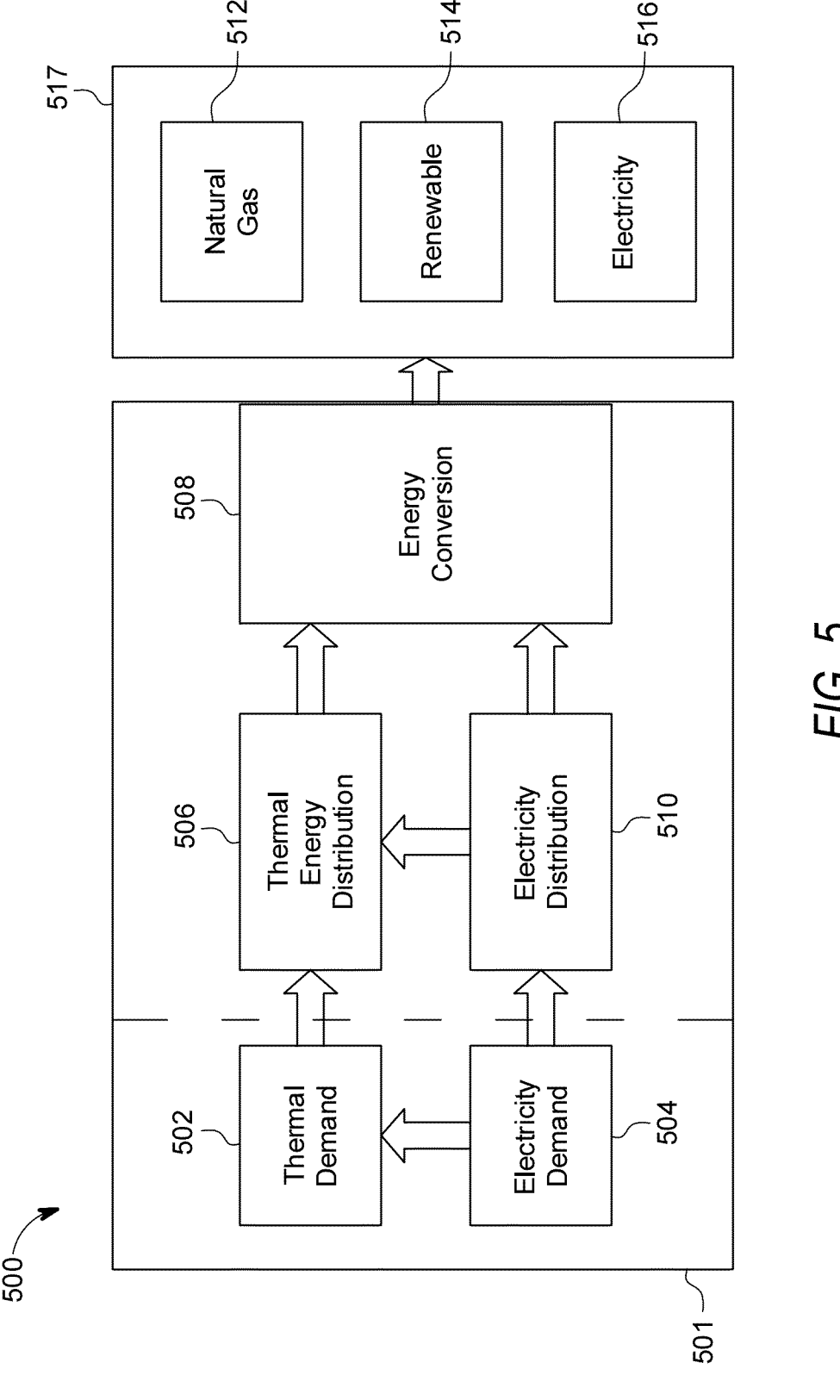
FIG. 5 is a block diagram of an energy model of the connected energy management system of FIG. 1.

FIG. 5 illustrates a block diagram of an energy model 500 of the connected energy management system 100 of FIG. 1. The energy model may be located in the simulation manager 300 which is housed by the controller 104 of the energy management system 100. Each system component 106 or building envelope 302 of the system 100 can consume electricity 516 and/or natural gas 512. Building energy demands 501 include both thermal demands 502 and elec-tricity demand 504, which can be satisfied through thermal energy distribution 506 and electricity distribution 510, respectively, and/or through energy conversion 508, by the supply of natural gas 512, renewable power 514, and/or electricity 516. As such, natural gas 512, renewable power 514, and electricity 516 can all be a part of the energy component supply 517 of the system 100. In one instance, the energy consumption of the system 100 may be calculated or entered by a user, such as the user 416. For example, the user may enter the information, such as the energy consumption, through the user enrollment 402.

Figure 6:
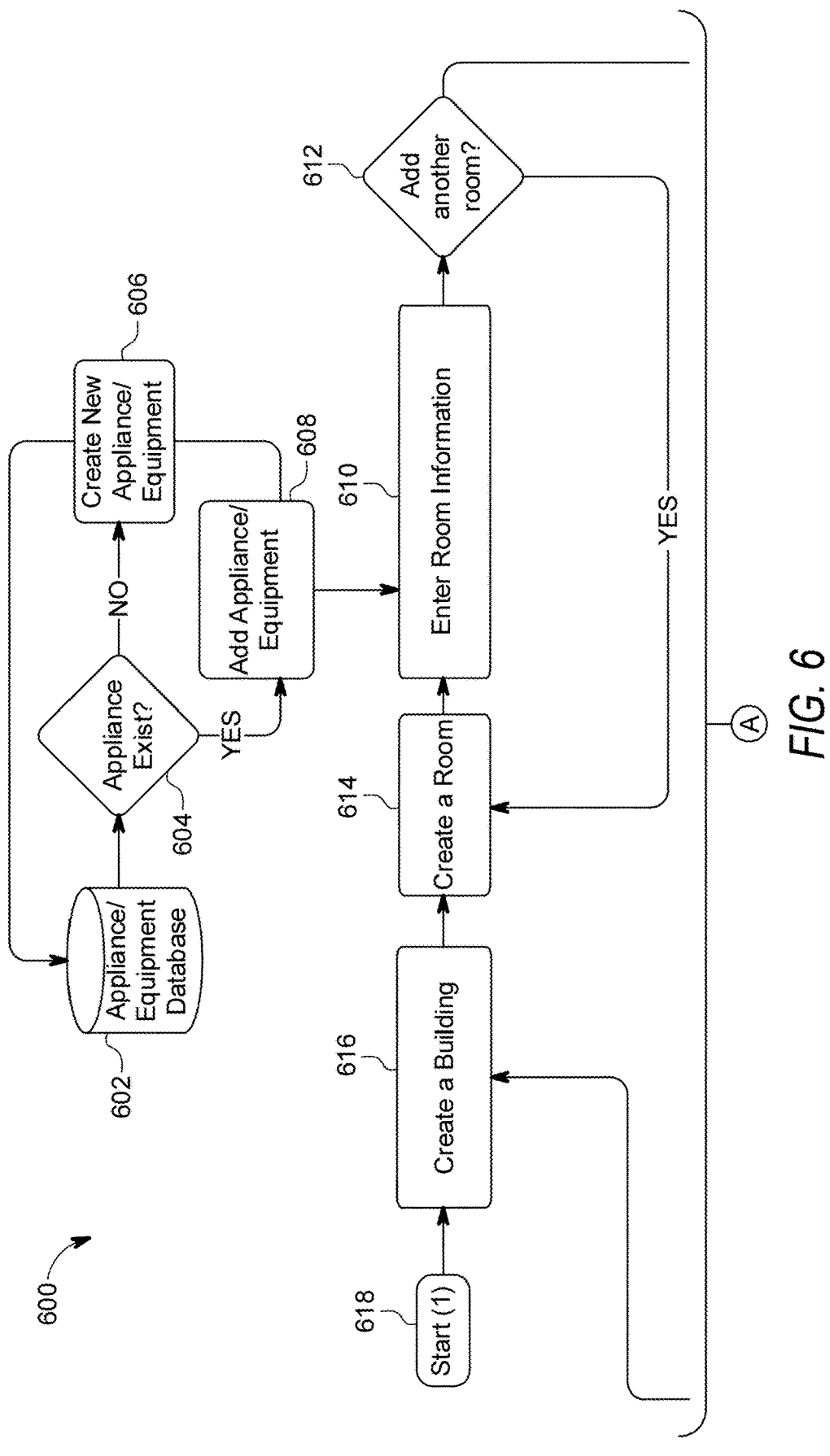
FIG. 6 is a flow diagram of exemplary energy audit and analysis features of the energy management system of FIG. 1.
Figure 6:
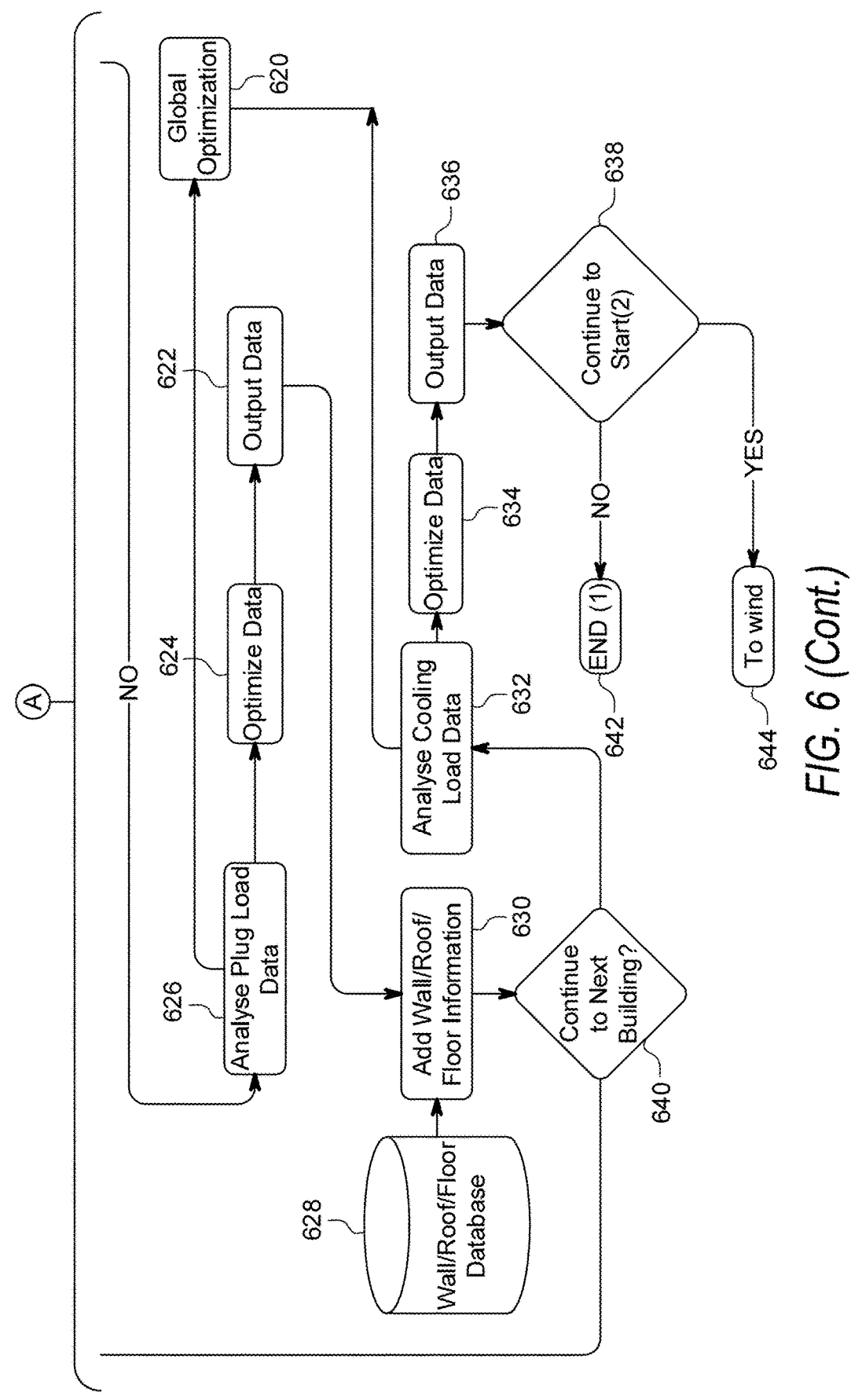

FIG. 6 illustrates a flow diagram of an exemplary energy audit 600 of the energy management system 100. The energy audit 600 may include features that represent the essential nature of the services provided by the energy management system for energy users or consumers. The energy audit 600 may be stored in the controller 104 of the system 100.

Users 416 of the system 100 may, for example, administer the audit through the user device 102, which may include an application or web account. The user 416 can begin the audit by selecting the "Start (1)" 618 and in turn, this will initiate monitoring the energy consumption. The user 416 can create a building 616. For example, the user 416 may do this through the user enrollment 402 as described in FIG. 4. Creating a building 616 may include, for example, entering a building name, and a location which may include a latitude and longitude. Creating a building 616 may also include creating one or more rooms 614 and entering room information 610. Room information may include, for example, indoor temperature, indoor relative humidity, number of people occupying that room, room dimensions, and any window dimensions. Once the building 616 and the room 614 are created within the audit 600, the user 416 may add any appliance or equipment information 608. In one instance, the appliance and other equipment information 608 can be obtained from an appliance/equipment database 602. The appliance/equipment database 602 stores information from buildings that may have been previously audited. If the building has not been previously audited, the audit 600 will inquire about the existence of an appliance 604 and give the user 416 the option to create a new appliance 606.

Once at least one building 616 and room 614 are created, and an optional appliance is included in the audit 600, then the user 416 may add another room 612 to the audit. When the rooms 612 and/or 614 are added, the audit 600 set-up continues.

In some embodiments, the audit 600 of the system 100 may then analyze the plug load data 626 and optimize the data 624 locally, before an output 622 and a global optimization 620 of the data. In some embodiments, output data may include, but is not limited to, energy use intensity (EUI) of at least one of the lighting, air conditioning, appliances, total lighting kilowatts, total air conditioning kilowatts, gross floor area, window-floor area, and/or occupant density. The output data 622 can be presented generally for the entire building or building envelope, or on a room-by-room basis.

Returning to the plug load data 626, the audit 600 may communicate the data 626 to the global optimization 620, which can be performed by the controller 104 or relevant methods within the simulation manager 300 of the system 100. The global optimization 620 can be developed by different regression models and optimization schemes, including the sequential least square programming (SLSQP) algorithm. The optimized data, which may include the energy consumption pattern per appliance, space heating, cooling load, and/or a performance comparison with the historical pattern for the building envelope, can then be output.

To aid the audit 600, the user 416 may also cause the input of their historical consumption data, which can include past energy usage data and past payment data, via the network 110 and the local distribution company 404. Wall, roof, and/or floor information 630 may be added to the created building 616 and/or each created room 614 via a wall, roof, and/or floor database 628. The database 628 stores information such as that disclosed in reference to FIG. 4, particularly for buildings that have been audited before. If the wall, roof, and/or floor database 628 does not have data, the user can add wall, roof, and/or floor information 630 for each building and/or each room. The information for the walls may include at least one of the orientation, thickness, area, and thermal conductivity of the materials. The information for the roofs may include at least one of type, area, and thermal conductivity. The information for the floors may include the area. Once the information 630 has been input into the audit 600 of the system 100, the option to continue to the next building 640 is presented.

Upon continuing in the audit 600, the (e.g., cooling load) data is analyzed 632 based on calculations using the wall, roof, and/or floor information 630 to capture behavioral characteristics of the building and/or the building envelope. The data may be analyzed 632, optimized 634, and output 636, by the audit 600 of the system 100, based on at least one of the nine formulas (e.g., equations/formulas 1-9) below. After the energy audit 600 is complete, the system 100 can return to the start and display a "Start(2)" 638 prompt for the user 416 to further audit and analyze features of the system 100, such as solar energy sizing features 644.

$$P_L = \frac{\sum_{i=1}^{j}(W \times n)_i}{1000} \qquad \text{Formula 1}$$

$$E_L = \frac{\sum_{i=1}^{j}(W \times n \times t)_i}{1000} \qquad \text{Formula 2}$$

$$P_L = \frac{\sum_{i=1}^{j}(W \times n)_i}{1000} \qquad \text{Formula 3}$$

$$E_L = \frac{\sum_{i=1}^{j}(W \times t \times n)_i}{1000} \qquad \text{Formula 4}$$

$$\begin{aligned}Q_{sensible,total} = Q_{lighing} + Q_{sensible,occupancy} + \\ Q_{sensible,appliances} + Q_{power\ loads} + Q_{roof} + Q_{walls} + \\ Q_{windows} + Q_{partitions} + Q_{sensible,infiltration} + Q_{sensible,ventilation}\end{aligned} \qquad \text{Formula 5}$$

$$\begin{aligned}Q_{total} = Q_{lighting} + Q_{occupancy} + Q_{appliances} + Q_{power\ loads} + \\ Q_{roof} + Q_{walls} + Q_{windows} + Q_{partitions} + Q_{infiltration} + Q_{ventilation}\end{aligned} \qquad \text{Formula 6}$$

$$ZER\ (availability) = nZEV/\sum_{i=1}^{R}ZEV_i \qquad \text{Formula 7}$$

$$ZER\ (affordability) = cNZEV/cZEV \qquad \text{Formula 8}$$

$$ZER\ (accessibility) = EUI_{nZEV}/EUI_{Total} \qquad \text{Formula 9}$$

In Formulas 1-9, $P_L$ is the total power consumed by light bulbs in kW, $E_L$ is the total energy consumed by light bulbs in kWh, W is the power rating of each light bulb in W, n is the total number of light bulbs of the same type and power rating, i is the index of light bulbs, j is the last index of light bulbs, and t is the number of operating hours for each light bulb, $Q_{total}$ is the total cooling load required for the space in Btu/hr, nZEV is the number of zero-emission vehicle available to user in a default residential building envelope; $ZEV_i$ is the ratio of zero-emission vehicle available to user within i transport instance outside the building envelope; cNZEV is the cost transportation through available non-ZEV or fossil fuel vehicles; cZEV is the cost of transportation through a base model of ZEV; $EUI_{nZEV}$ is the energy use intensity of all the number of zero-emission vehicles available; and $EUI_{Total}$ is the total energy use intensity of all the audited appliances in the building.

Figure 7:
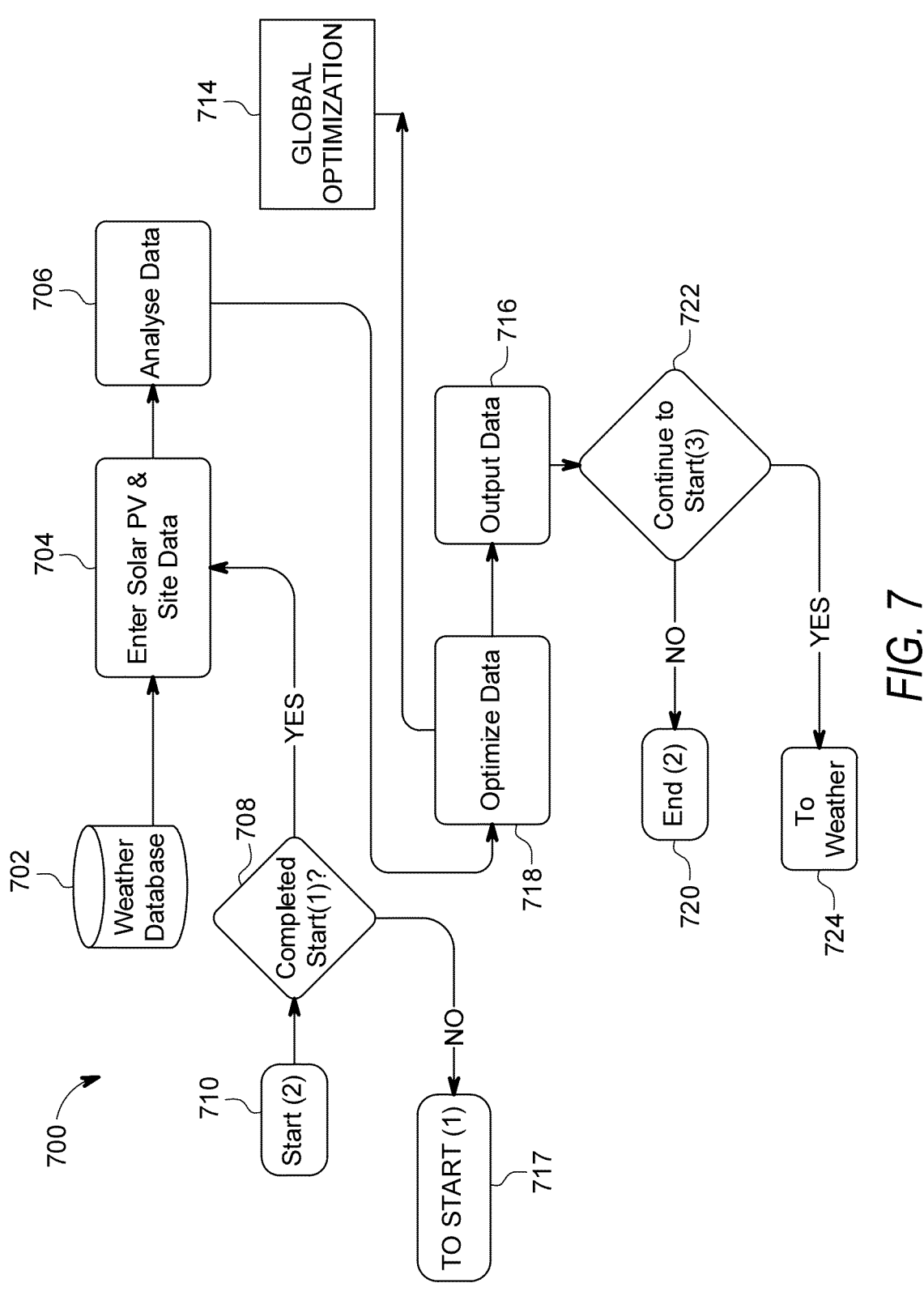
FIG. 7 is a flow diagram of exemplary solar energy sizing features of the energy management system of FIG. 1.

FIG. 7 illustrates a flow diagram of exemplary solar energy sizing 700 of the energy management system 100. The diagram illustrates the assessment of the solar energy potentials and the performance of solar energy devices within the space encompassed by the building or the building envelope being analyzed. Once the building 616 and room 614 information is created and added to the energy audit 600 features, the user 416 may use the device 102 or interface 306 and proceed to "Start (2)" 710 of the global optimization 714 of the solar energy sizing features 700, as depicted in FIG. 7. At 708, the system 100 inquires whether a user 416 has completed "Start (1)" 618 of the energy audit 600 by entering the prompted features. If there is missing information or if the analysis has not been completed, the user 416 is directed back to the energy audit 600 features 717.

In the instance when "Start (1)" 618 has been completed, the user 416 is prompted to enter solar photovoltaic (PV) and site data 704. The solar PV and site data 704 can be taken from the weather database 702. Solar PV and site data 704 may include but is not limited to, site name and location, latitude and longitude, elevation, number of wings, site area and pitch, maximum input voltage, maximum power point tracking (MPPT) which is the tracking of the point at the intersection of the current and voltage curves, where power generated by the solar PV module is maximum, units, efficiency, MPPT Upper, and MPPT Lower. The weather database 702 may store the longitude and latitude, elevation, and/or temperature of the site. The solar PV and site data 704 may then be analyzed 706, optimized 718 based on Formulas 10-12 below, and output 716.

$$Ppv_h = \eta \times G \times A_{pv} \qquad \text{Formula 10}$$

$$Epv_h = \eta \times G \times A_{pv} \times h \qquad \text{Formula 11}$$

$$N_{pv} = \frac{A_{pv}}{A_{upv}} \qquad \text{Formula 12}$$

In Formulas 10-12, $Ppv_h$ is the power generated by the PV system at hour h in W, $\eta$ is the efficiency of the PV system, given as 18% for this design, G is the solar irradiance in W/m², and $A_{pv}$, is the total area of the PV panels, $N_{pv}$, is the number of units of PV panels, and $A_{upv}$, is the area of a unit of PV panel.

The output data 716 may include but is not limited to, actual power, annual energy, specific energy, installed capacity, total number of PV modules, number of PV modules per wing, minimum and maximum number of modules, minimum daily PV energy output, MPPT upper and lower, system efficiency, performance ratio, minimum voltage, voltage inverter, F_dirt, F_man, F_temperature, area, VoC, Ac cable efficiency, DC Cable efficiency, inverter efficiency, and/or average PSH.

After the solar energy sizing feature 700 is complete, the system 100 will prompt the user 416 to 'continue to "Start (3)"' 722 to further audit and analyze wind energy sizing features 724.

Alternatively, the user 416 can choose not to continue to "Start (3)" and the system proceeds to "End (2)" 720.

Further, returning to the data optimization at step 718, the data may then be communicated to a system for global optimization 714. The global optimization 714 aggregates the existing optimization of outputs from all the methods assessed by user 416, in addition to exemplary solar energy sizing 700 of the energy management system 100.

Figure 8:
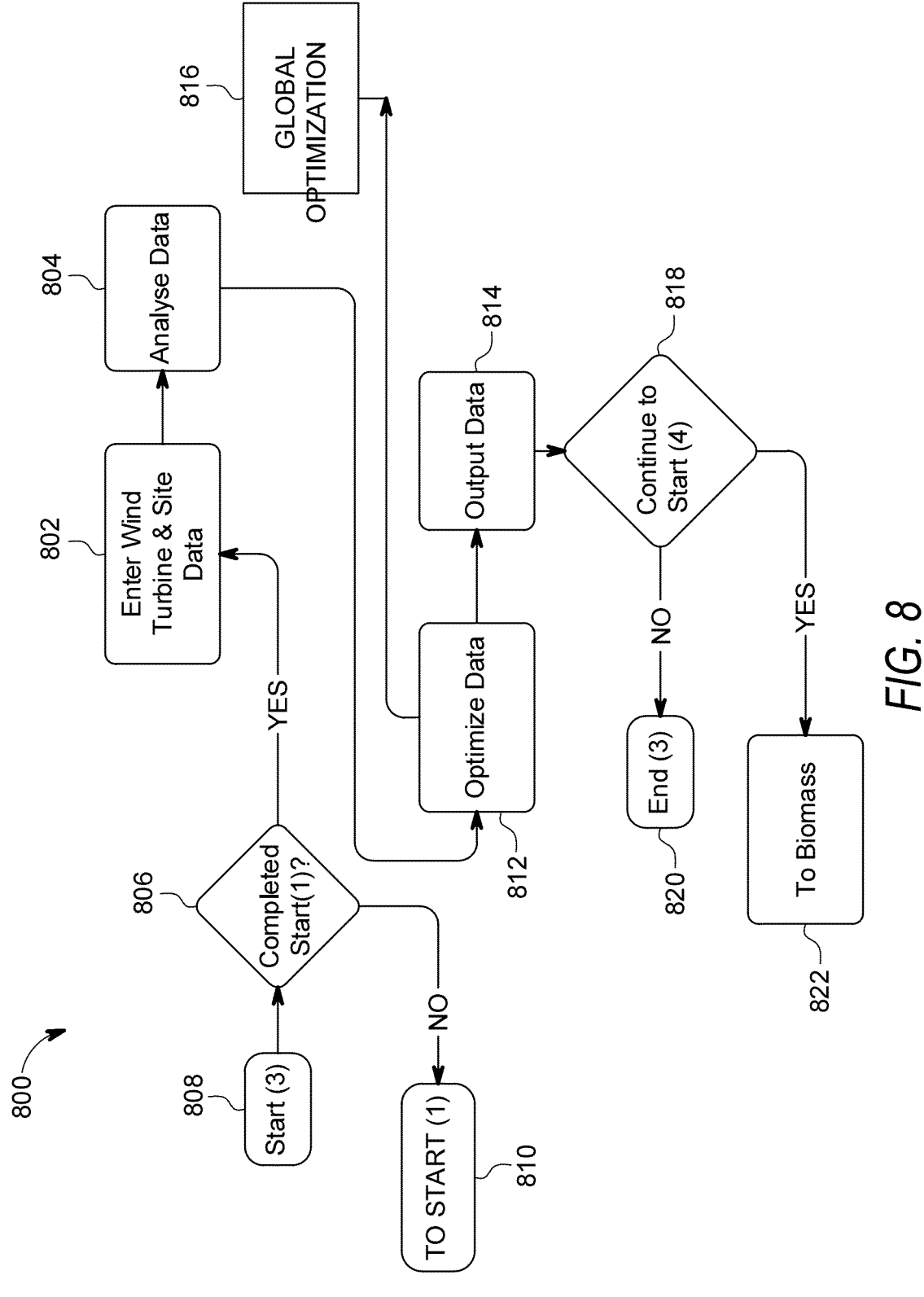
FIG. 8 is a flow diagram of exemplary wind energy sizing features of the energy management system of FIG. 1.

FIG. 8 illustrates a flow diagram of exemplary wind energy sizing 800 of the energy management system 100. The wind energy sizing 800 flow chart depicts the assessment of the wind energy potentials and the performance of wind energy devices within the space encompassed by the building or the building envelope. Similar to the previously disclosed flow charts in FIGS. 6-7, the user 416 of the system 100 may proceed to "Start (3)" 808 if "Start (1)" 810, which can be "Start (1)" 618 of FIG. 6, has been completed. Once it is confirmed that "Start (1)" is completed at step 806, the user 416 may enter any wind turbine information and other additional site data 802. Such data may include but is not limited to the site name, latitude and longitude, air pressure, density, velocity, outdoor temperature, altitude, height, shape parameter, cut-in and cut-out wind speeds, and rotor diameter. This data may then be analyzed 804, optimized 812, and output 814 based on Formulas 13-15 below. The data output may include but is not limited to total power and efficiency. Similar to previous flow charts, once the data is output 814, the system inquires whether a user would like to 'continue to "Start (4)"' 818 to further audit and analyze biomass energy sizing features 822.

$$TSR = \frac{\text{Tip speed of blade}}{\text{Wind speed}} \qquad \text{Formula 13}$$

$$P_w = 0.6 C_p N A V^3 \qquad \text{Formula 14}$$

$$\text{Revolutions (rpm)} = \frac{V \times TSR \times 60}{6.28R} \qquad \text{Formula 15}$$

In Formulas 13-15, where $P_w$, is the power generated by the wind turbine in W, $C_p$, is the coefficient of performance or rotor coefficient, usually 0.4, N is the efficiency of driven machinery, A is the rotor swept area in m², V is the wind velocity in m/s, and TSR is the tip speed ratio.

Alternatively, the user 416 can choose not to continue to "Start (4)" and the system proceeds to "End (3)" 820.

The global optimization 816 aggregates the existing optimization of outputs from all the methods as described herein assessed by user 416, in addition to exemplary wind energy sizing 800 of the energy management system 100.

Figure 9:
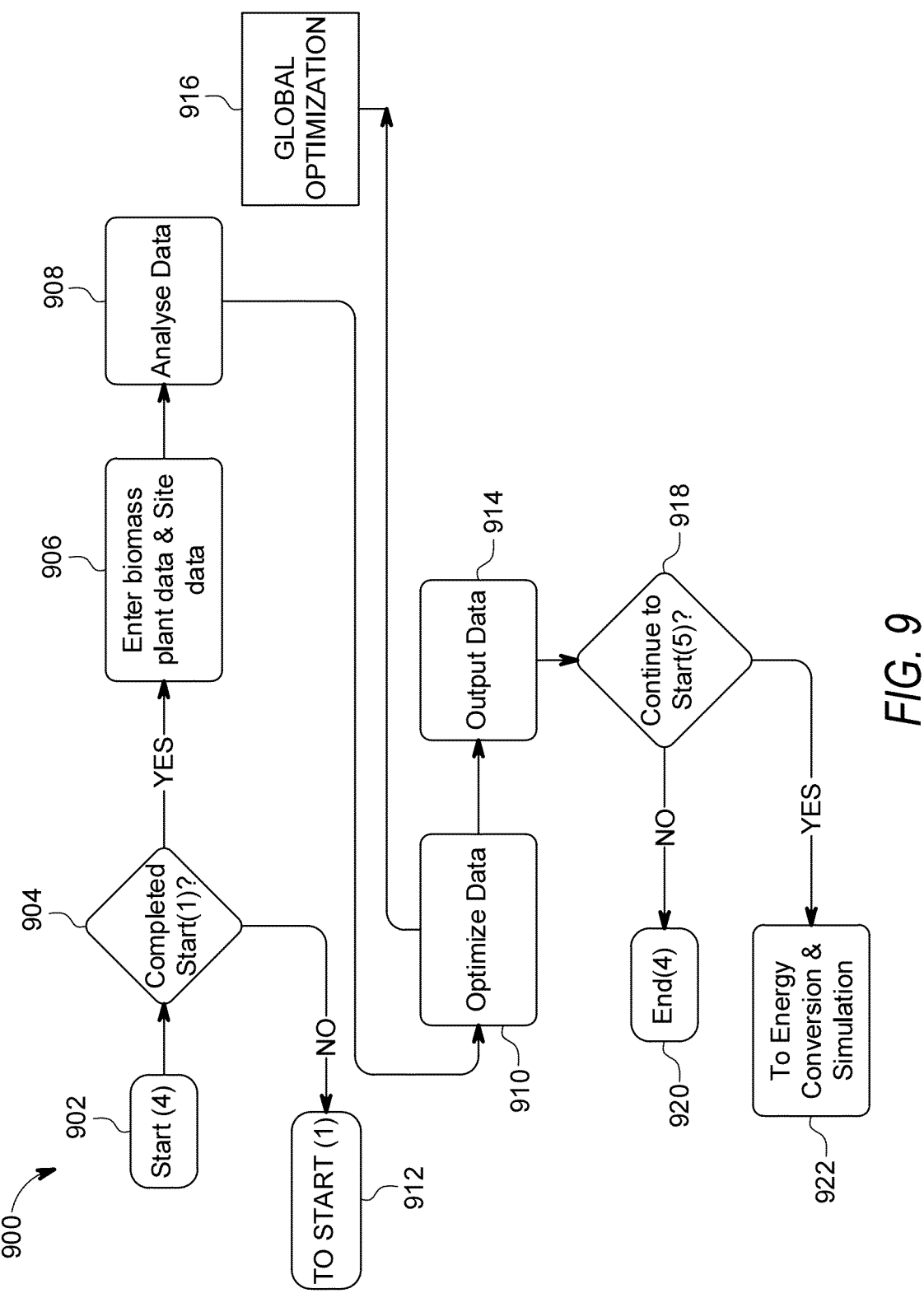
FIG. 9 is a flow diagram of exemplary biomass energy sizing features of the energy management system of FIG. 1.

FIG. 9 illustrates a flow diagram of an exemplary biomass energy sizing 900 of the energy management system 100. The biomass energy flow chart 900 depicts the assessment of the biomass energy potentials and the performance of biomass energy devices within the space encompassed by the building envelope. Similar to the previously disclosed flow charts in FIGS. 6-8, the user 416 of the system 100 may proceed to "Start (4)" 902, if "Start (1)" 912, which may be "Start (1)" 618, is completed 904. The user 416 may proceed by entering biomass plant data and site data 906. Such data may include but is not limited to, a type of feedstock, size of the biodigester, proximate analysis of feedstock, and/or ultimate analysis of feedstock. The biomass plant data 906 may then be analyzed 908, optimized 910, and output 914 based on Formulas 16-17, below. Exemplary output data may include but is not limited to, biogas production yield. Similar to previous flow charts, once the data is output 914, the system inquires whether the user 416 would like to 'continue to "Start (5)"' 918. to proceed to the energy conversion and simulation analysis 922.

$$P_{bm} = P_{ibm} \times n \times \left(1 - \frac{P_{aux}}{100}\right) \qquad \text{Formula 16}$$

-continued $$E_{bm} = P_{ibm} \times n \times h \times \left(1 - \frac{P_{aux}}{100}\right)$$  Formula 17

In Formulas 16 and 17, $P_{bm}$ is the actual power generated by the biomass plant in KW, $P_{ibm}$ is the installed output of the biomass generator in KW, n is the biomass plant capacity factor, and $P_{aux}$ is the percentage power consumption by the plant's accessories, $E_{bm}$ is the energy generated by the biomass plant in the given period in KWh, and h is the number of hours of biomass power generation.

Alternatively, the user 416 can choose not to continue to "Start (5)" and the system proceeds to "End (4)" 920.

The global optimization 916 aggregates the existing optimization of outputs from all the methods assessed by user 416, in addition to exemplary biomass energy sizing 900 of the energy management system 100.

Figure 10:
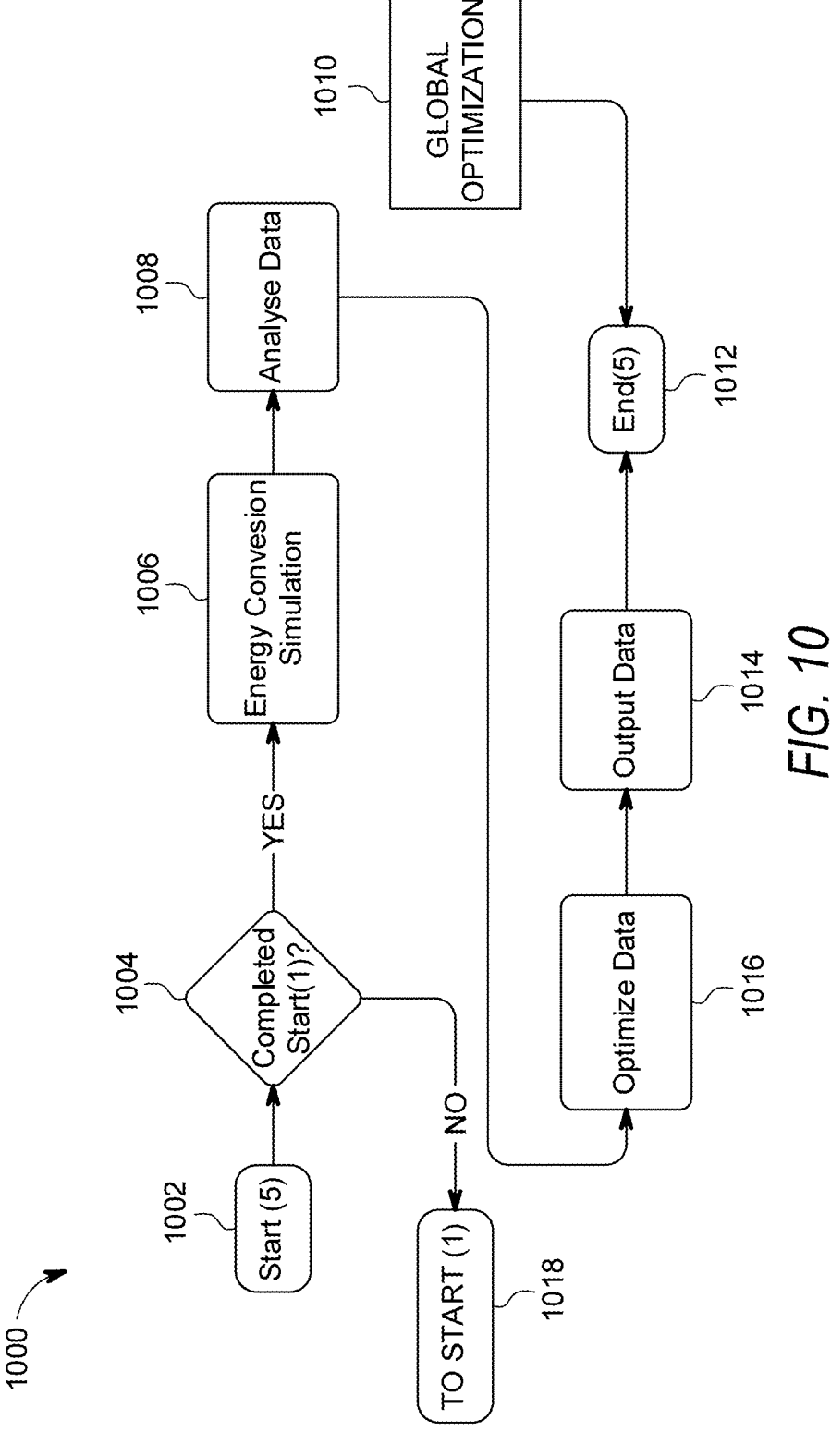
FIG. 10 is a flow diagram of exemplary energy conversion simulation features of the energy management system of FIG. 1.

FIG. 10 illustrates a flow diagram of exemplary heat and mass balance 1000 of the energy management system 100. Similar to the previously disclosed flow charts in FIGS. 6-9, the user 416 of the system 100 may proceed to "Start (5)" 1002, if Start (1) 618, is completed 1004. The user 416 may proceed by entering energy conversion and simulation data 1006. Exemplary energy conversion and simulation data may include but is not limited to, outdoor temperature, air speed, and/or number of occupants. The simulation data 1006 may then be analyzed 1008, optimized 1016, and output 1014 based on the generalized form of the heat and mass balance Formula 18 provided below. Exemplary output data may include but is not limited to, thermal comfort level and air pollution level. The numerical simulations of the thermal comfort and the indoor air quality of a built environment depend on the accuracy and stability of the computational fluid dynamics tool engaged. Once the output 1014 of the heat and mass balance 1000 is provided, the user 416 can choose "End (5)" 1012 to stop entering data for the system 100.

$$\partial/\partial t \ (\rho\varphi) + \nabla \cdot (\rho v\varphi) + \nabla \cdot (\Gamma\Delta\varphi) = S^\wedge$$  Formula 18

In Formula 18, $\varphi$ represents the scalar or vector field variables, like temperature, pressure, velocity, etc., v is the velocity vector, and $\hat{S}$ represents the source term within the built environment.

The global optimization 1010 aggregates the existing optimization of outputs from all the methods described herein and assessed by user 416, in addition to exemplary heat and mass balance 1000 of the energy management system 100. Global optimization is the aggregation of all the local analysis with each of the methods. In one instance, the global optimization 620 in FIG. 6 can be the same as the global optimization 714 in FIG. 7 or the global optimization 816 in FIG. 8 or the global optimization 916 in FIG. 9 or the Global Optimization 1010 in FIG. 10.

The global optimization of the energy management system 100 of FIGS. 6-10 represent the global aggregation of the local optimization of all the methods described herein within each of Start (1) 618, Start (2) 710, Start (3) 808, Start (4) 902, and Start (5) 1002. It implies that the outcome of the global optimization and the local optimization in the Start (1) 618 flow will be the same for all users, since Start (2) 710, Start (3) 808, Start (4) 902, and Start (5) 1002 may be inactive. The global optimization can produce the aggregate of the local optimization from the Start (1) 618, Start (2) 710, Start (3) 808, and Start (4) 902 flows for all users 416.

It should be appreciated that the data that is output 636, 716, 814, 914, and 1014 can either be output in real-time to the user 416 or can be output as a periodic communication, for example, as often as the API between the service provider and the users' LDC 404 is set up for communication. This data may include the electrical consumption data of the building, and/or the natural gas consumption data of the building. It should be further appreciated that the system 100 may use the API to receive meter data, transaction requests, invoicing, and payments from the energy users' utilities.

The system may start at Start (2) 710, Start (3) 808, or Start (4) 902 depending on the type of user 416 (e.g., the energy servers, the energy developers, and/or the energy consumers) using the system 100. In some cases, the system only includes at least one of Start (1) 618, Start (2) 710, Start (3) 808, and Start (4) 902. The Start (2) 710, Start (3) 808, and Start (4) 902 service supply loops may be an upgrade to the basic supply service system, depending on the recommended choice or interest in the renewable power supply services and energy management opportunities.

The energy management system 100 may perform thermal transport and flow simulations using an advection algorithm such as a Non-Inverted Skew Upwind Scheme (NISUS) to calculate heat transfer and fluid flow. These calculations may be used to calculate wind loads on the renewable power systems, including biomass plants, solar photovoltaic systems, wind turbine systems, solar domestic hot water collectors, and solar domestic hot air collectors; calculate snow loads on the renewable power systems, including biomass plants, solar photovoltaic systems, wind turbine systems, solar domestic hot water collectors, and solar domestic hot air collectors; calculate the effect of snow accretion on the renewable power systems, including biomass plants, solar photovoltaic systems, wind turbine systems, solar domestic hot water collectors, and solar domestic hot air collectors; calculate thermal comfort and indoor air quality in a built environment, including the contributions of heat, ventilation, air-conditioning, and cooling (HVAC) equipment; and calculate energy harvest optimization based on the size, location, angles of inclination, and installation methods for the renewable power systems, including biomass plants, solar photovoltaic systems, wind turbine systems, solar domestic hot water collectors, and solar domestic hot-air collectors.

Figures 11A, 11B:
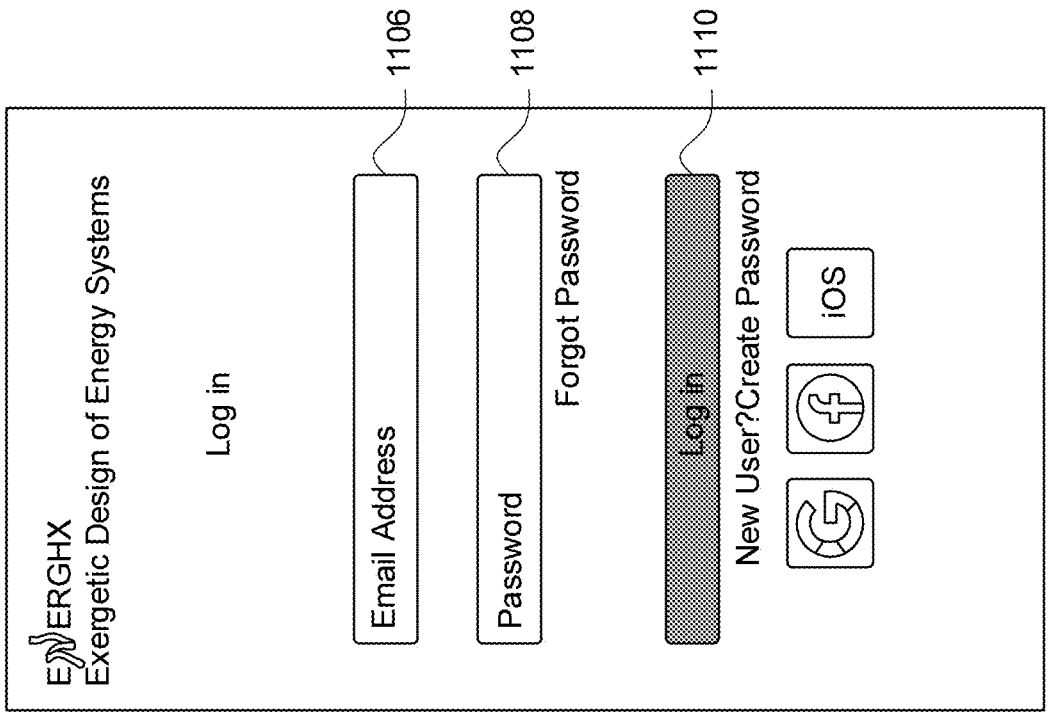
FIGS. 11A-11C are illustrations of interface graphics of the user device of FIG. 1.
Figure 11C:
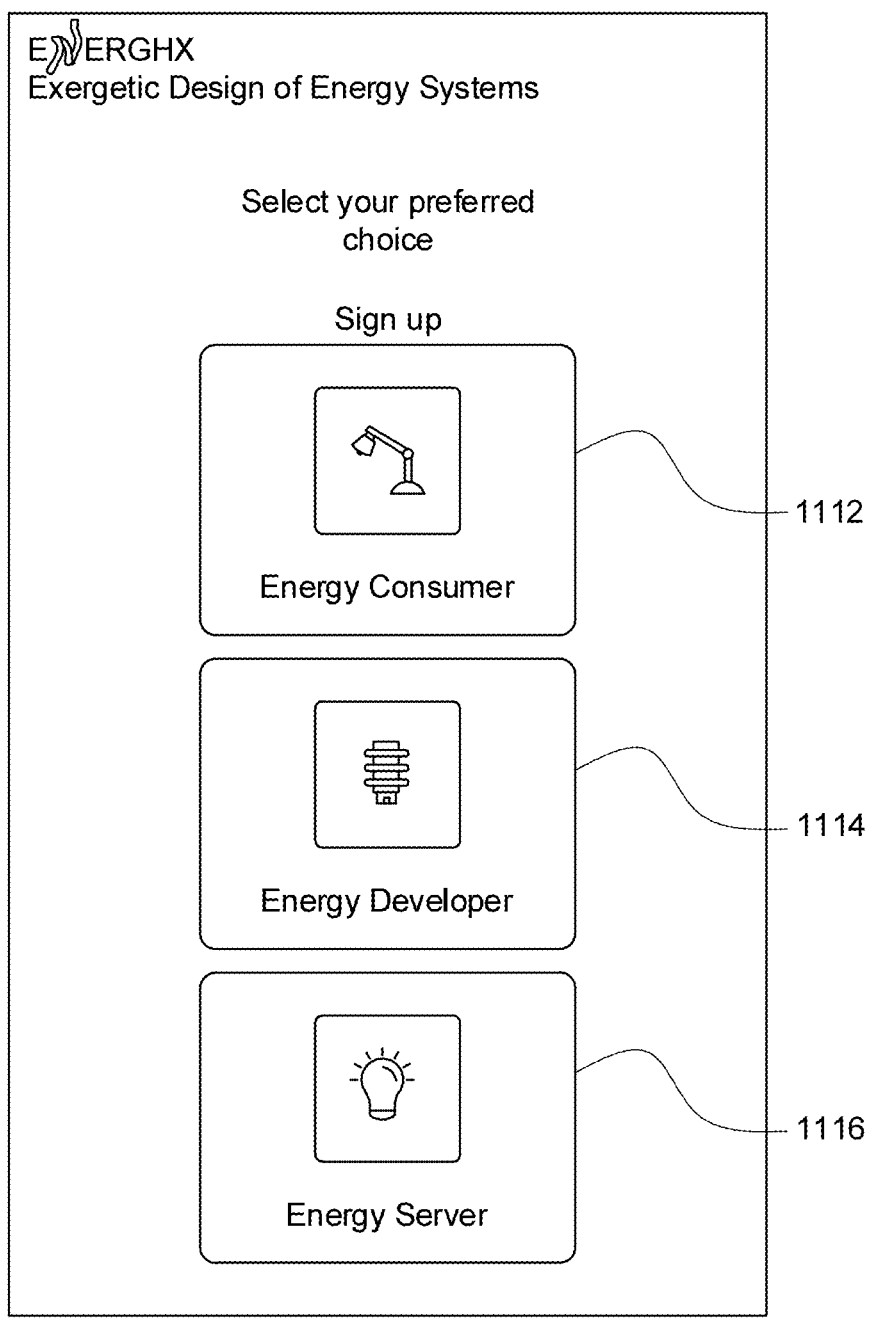
Figure 12A:
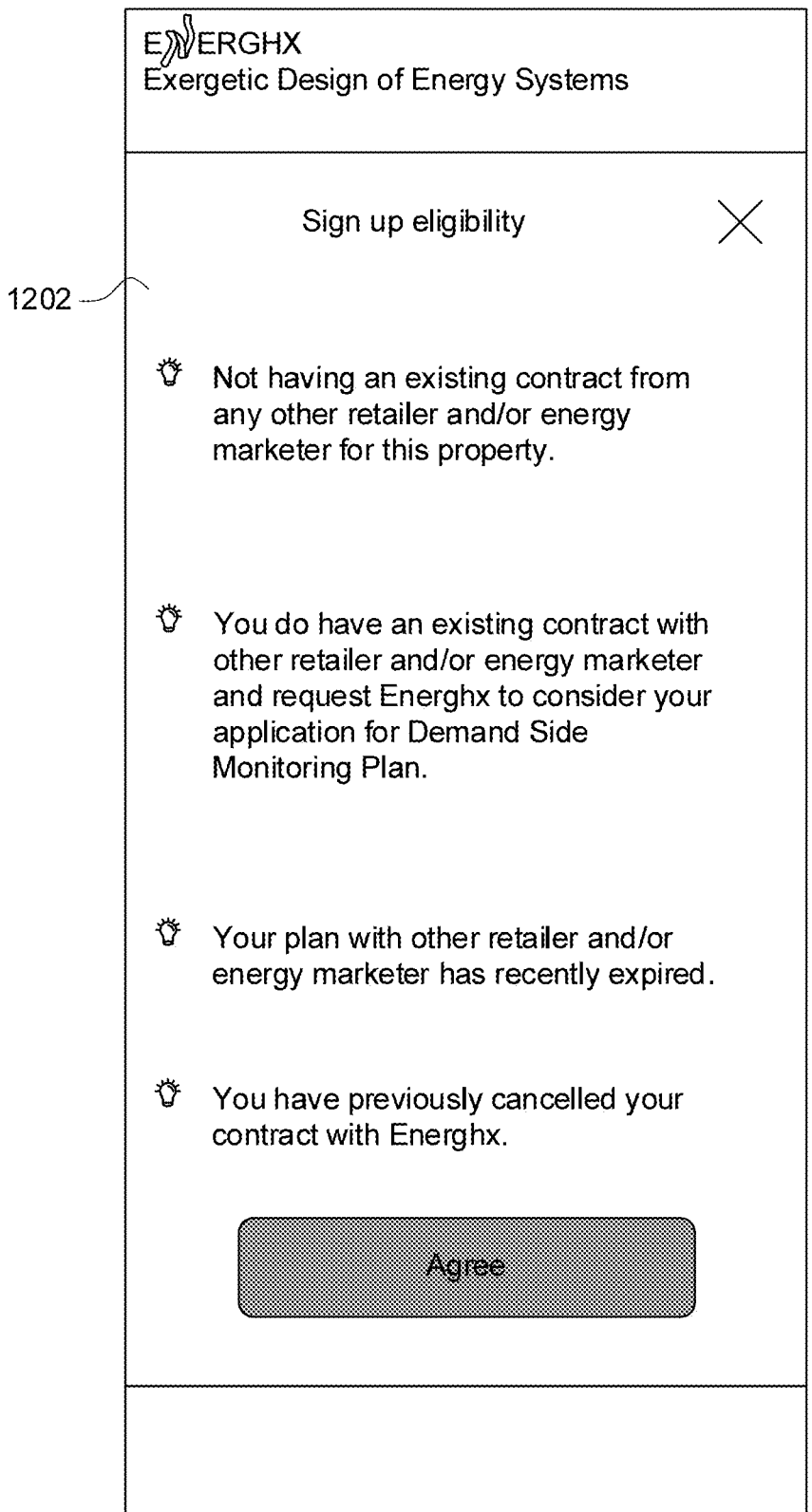
Figure 12C:
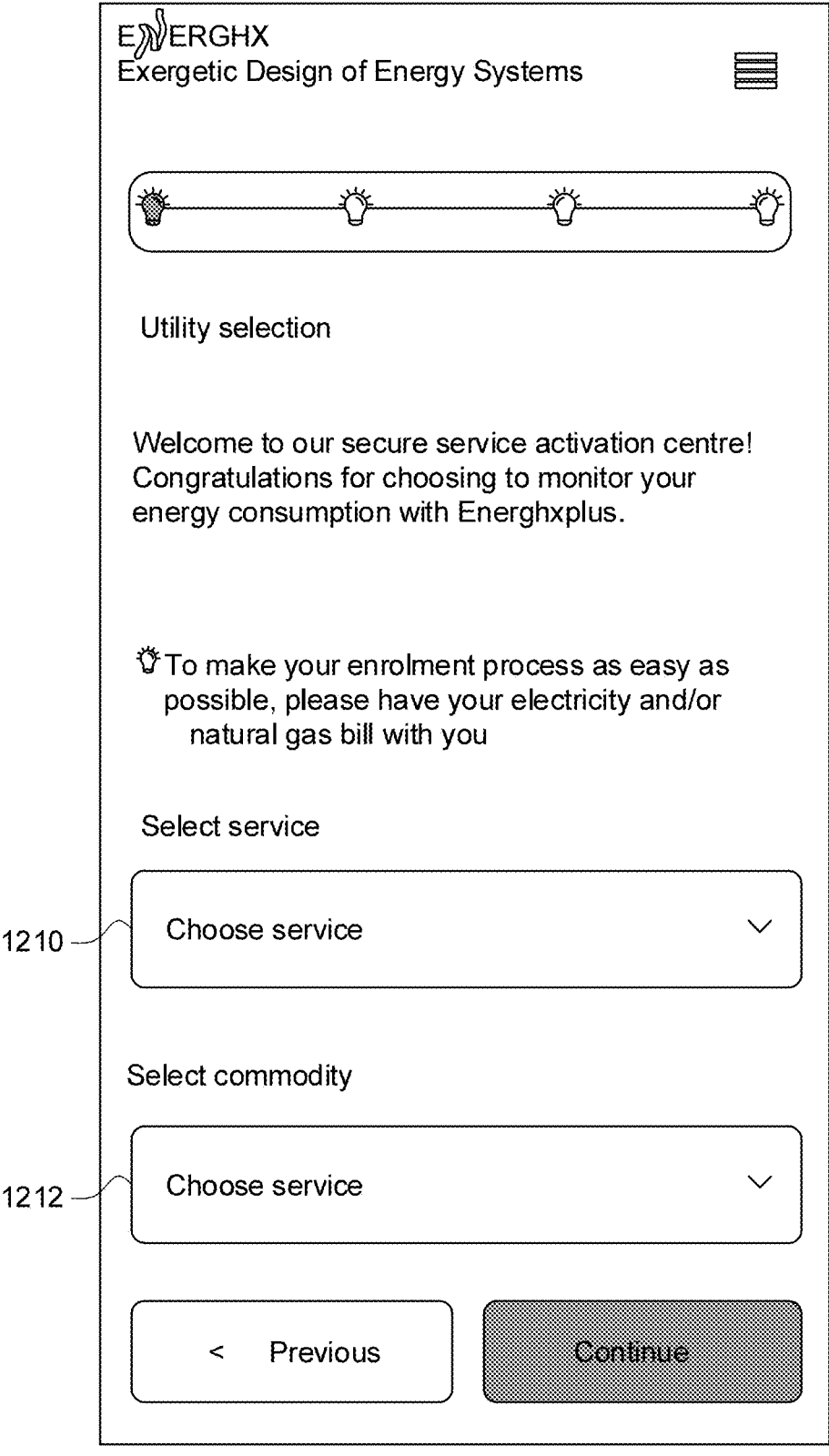
Figure 12D:
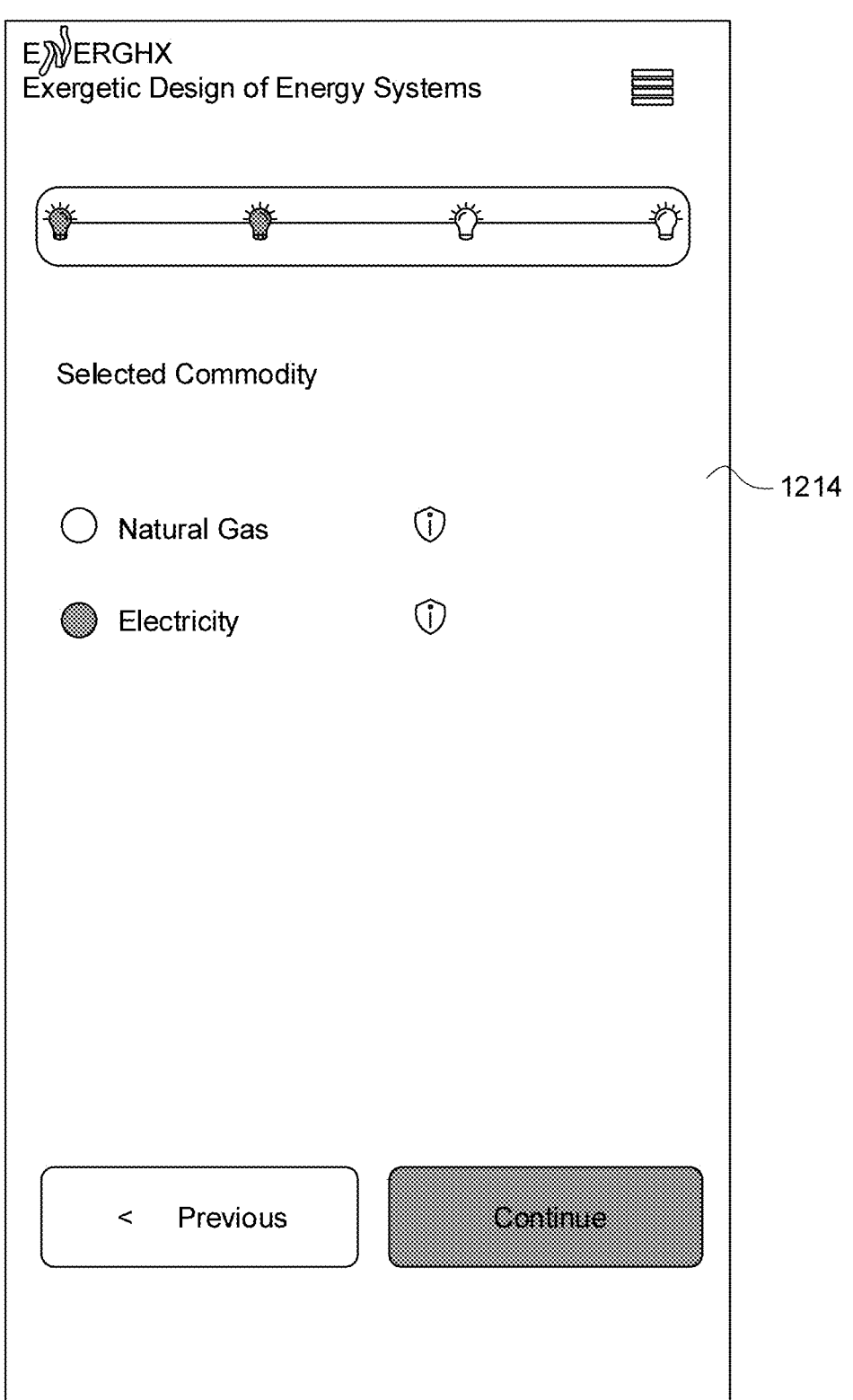
Figure 12E:
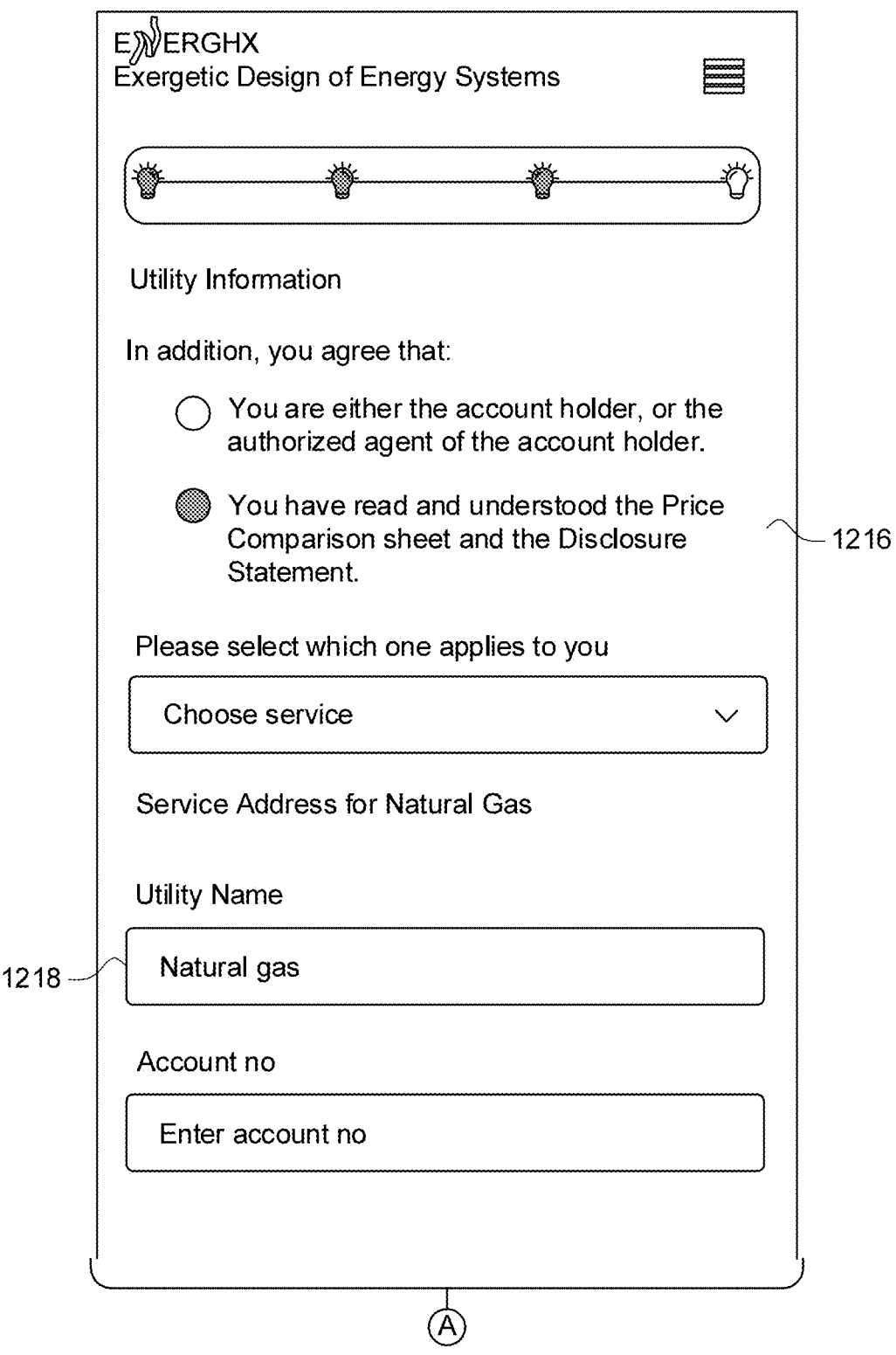
Figure 12F:
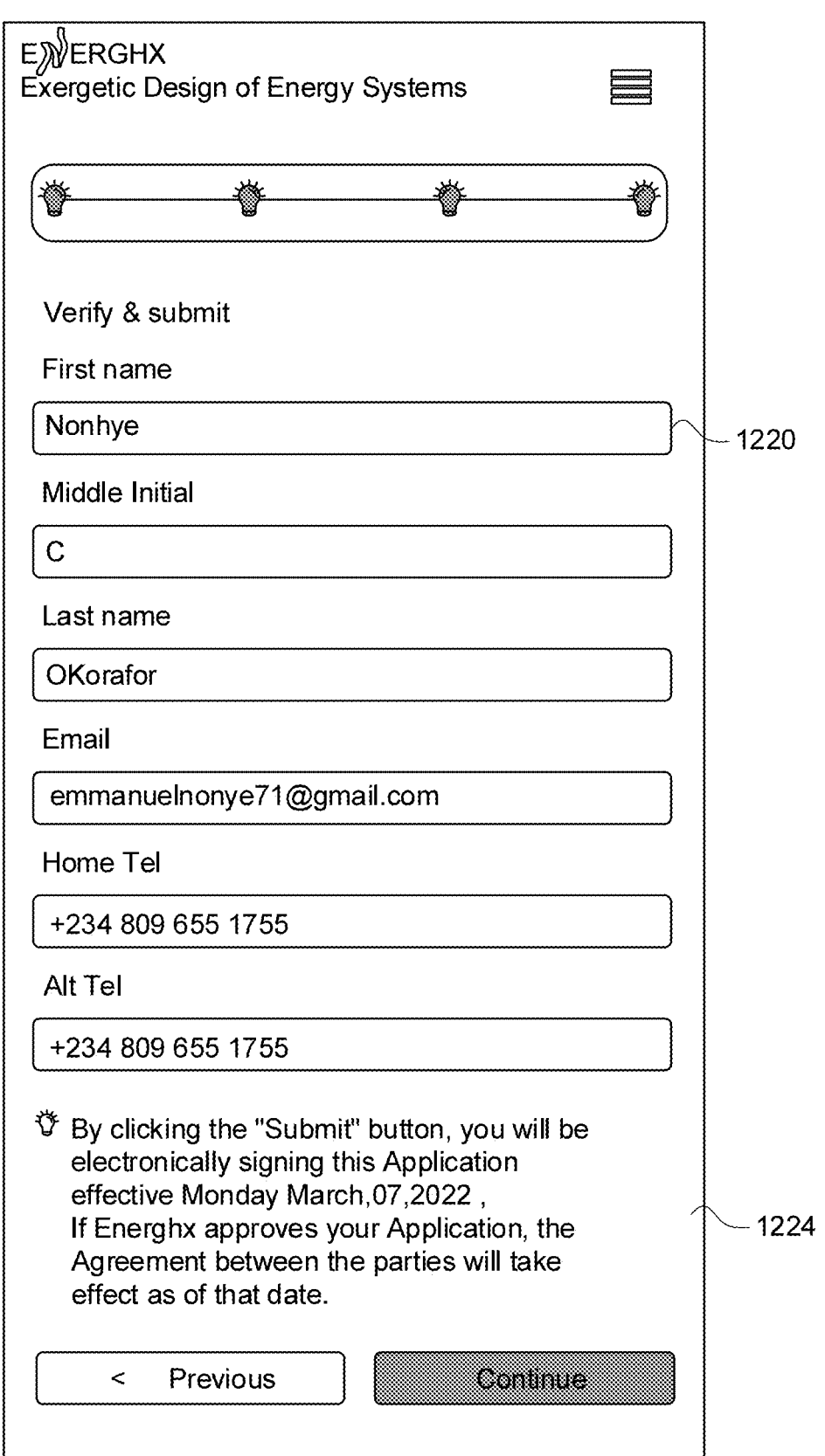
Figure 12G:
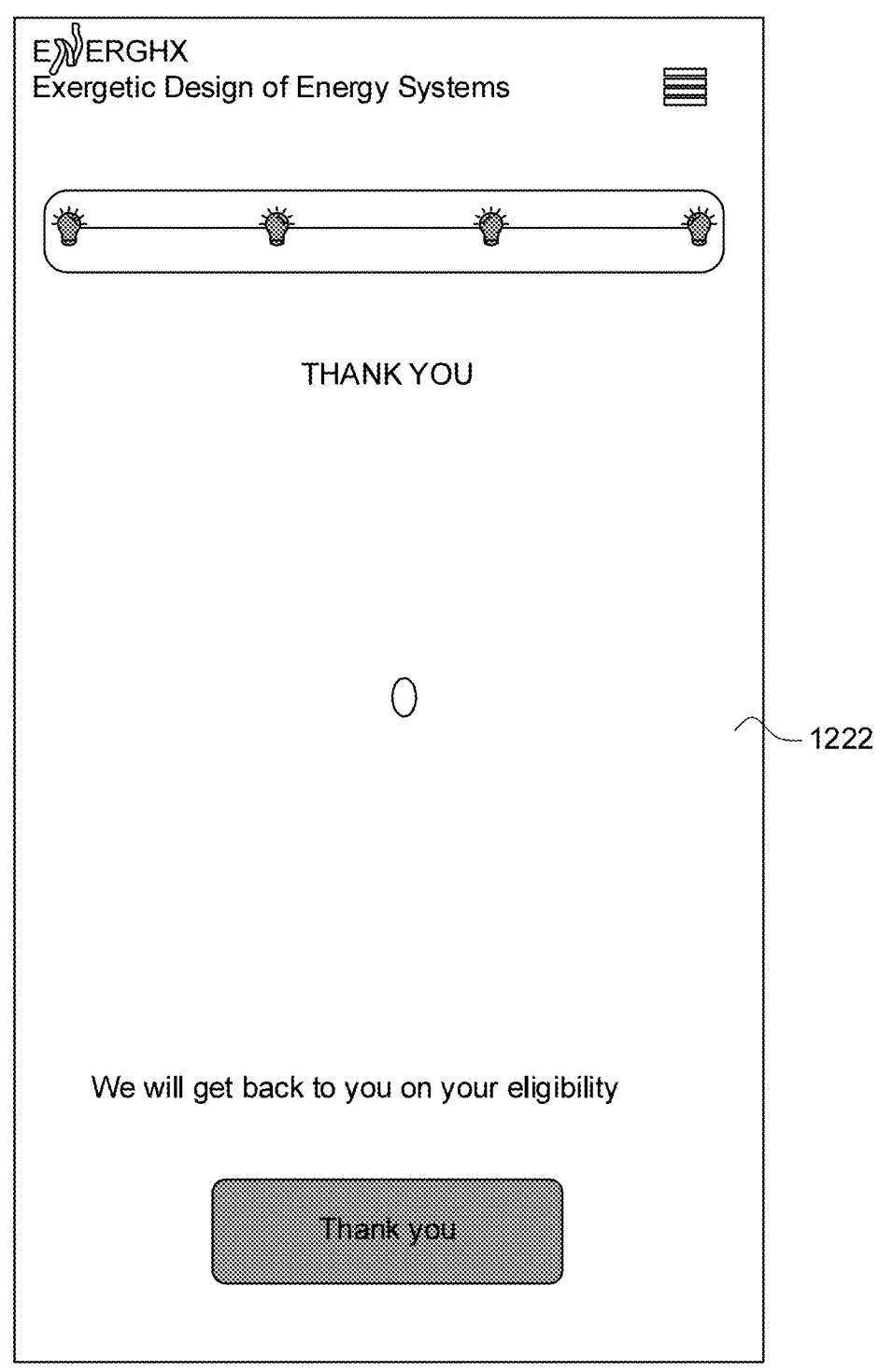
Figure 13C:
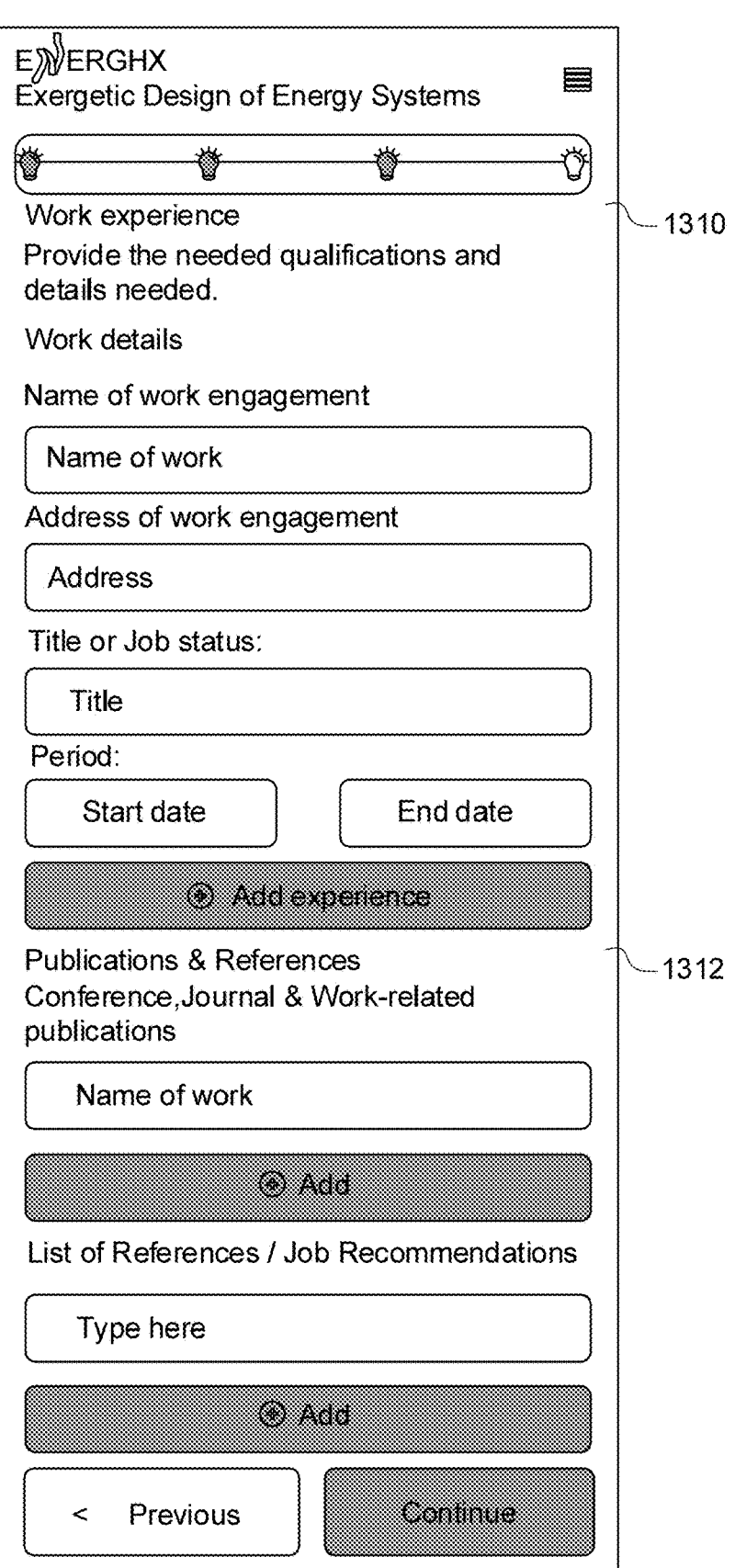
Figure 13E:
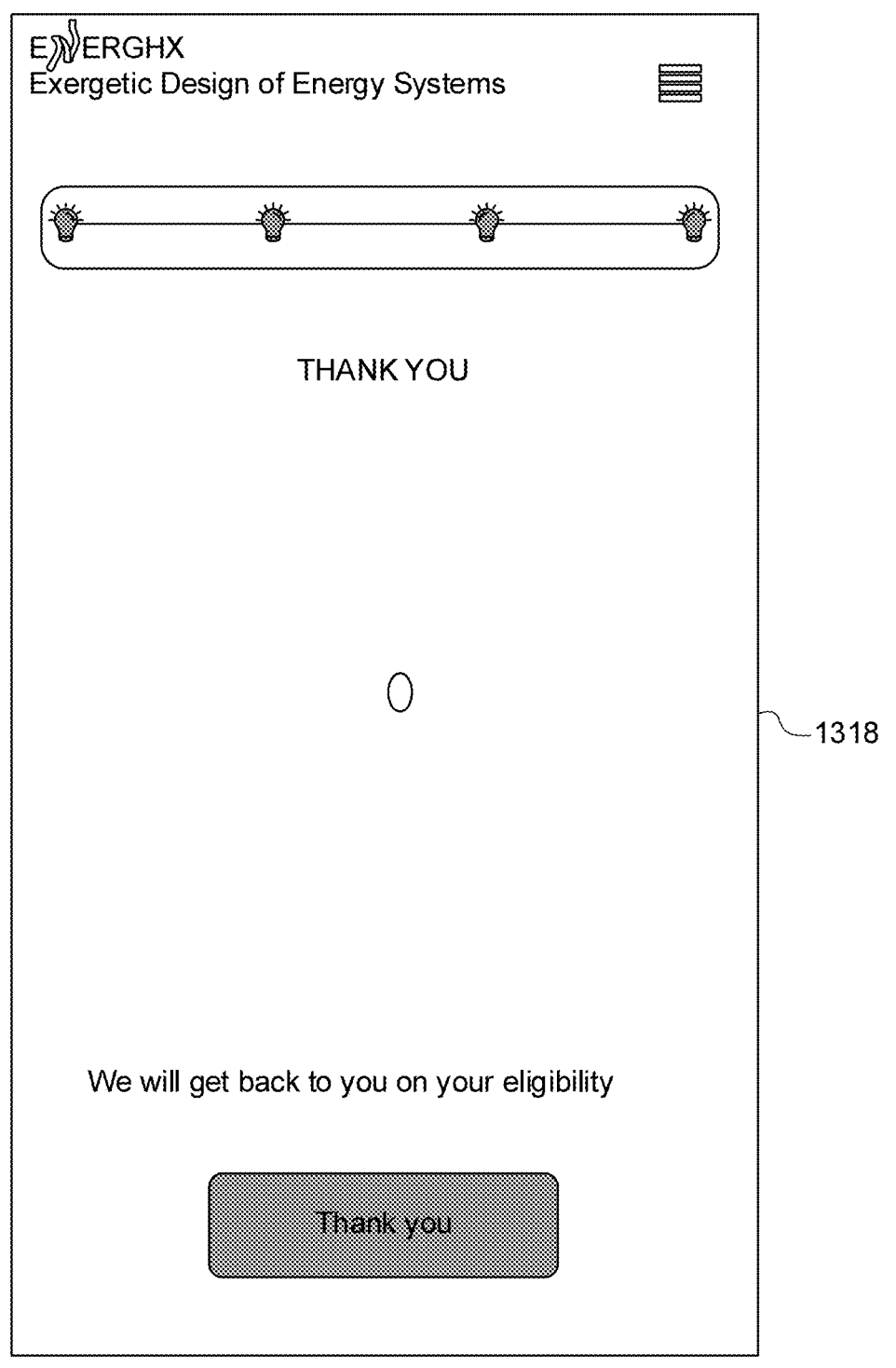
Figure 14B:
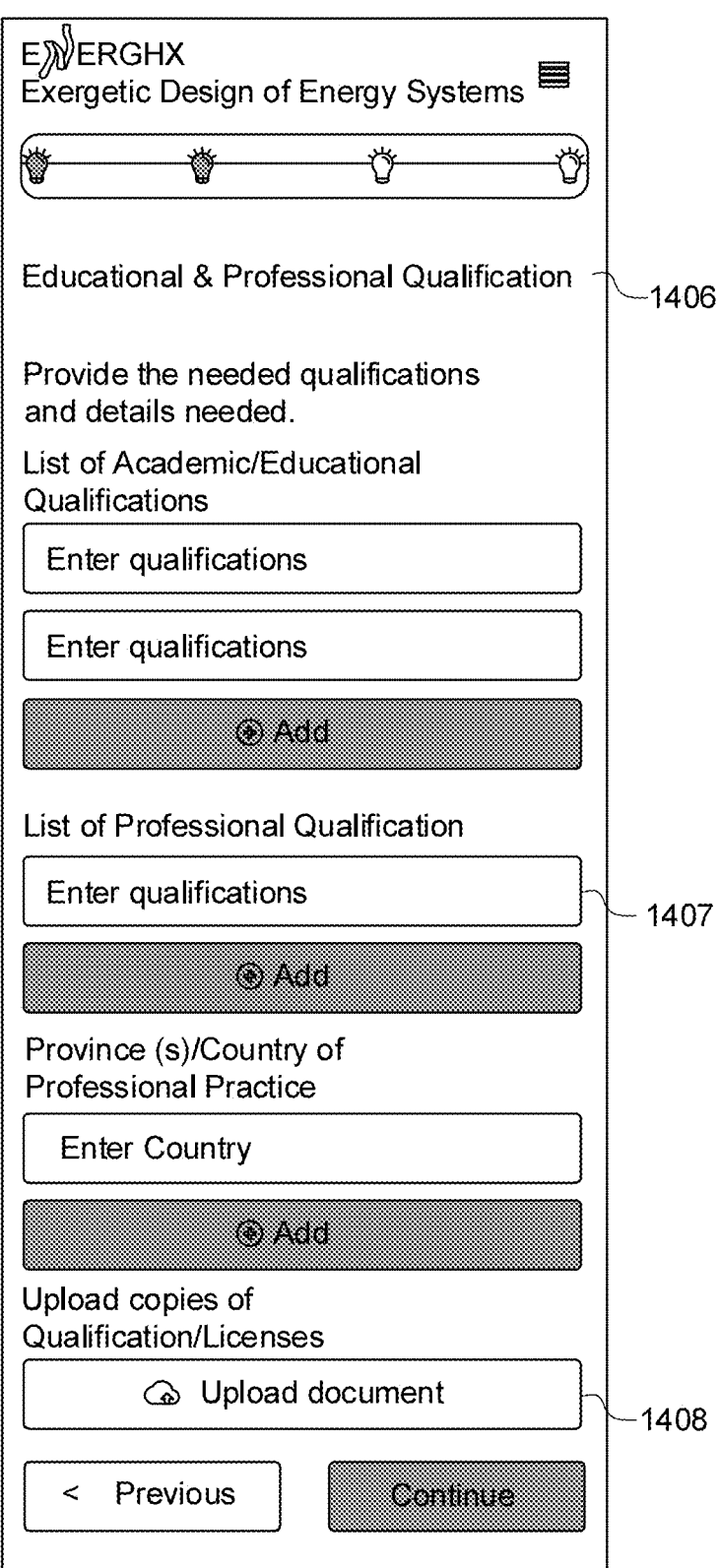
Figure 14C:
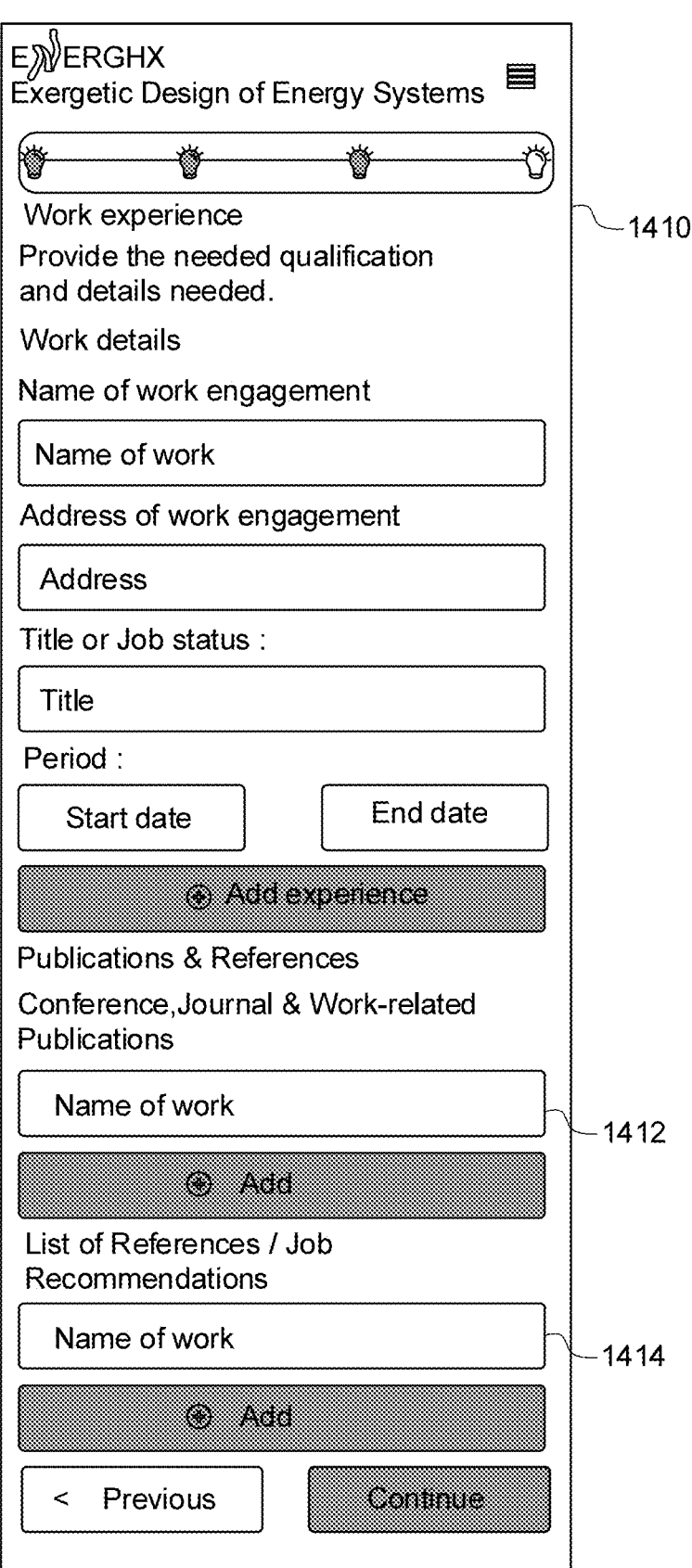
Figure 14E:
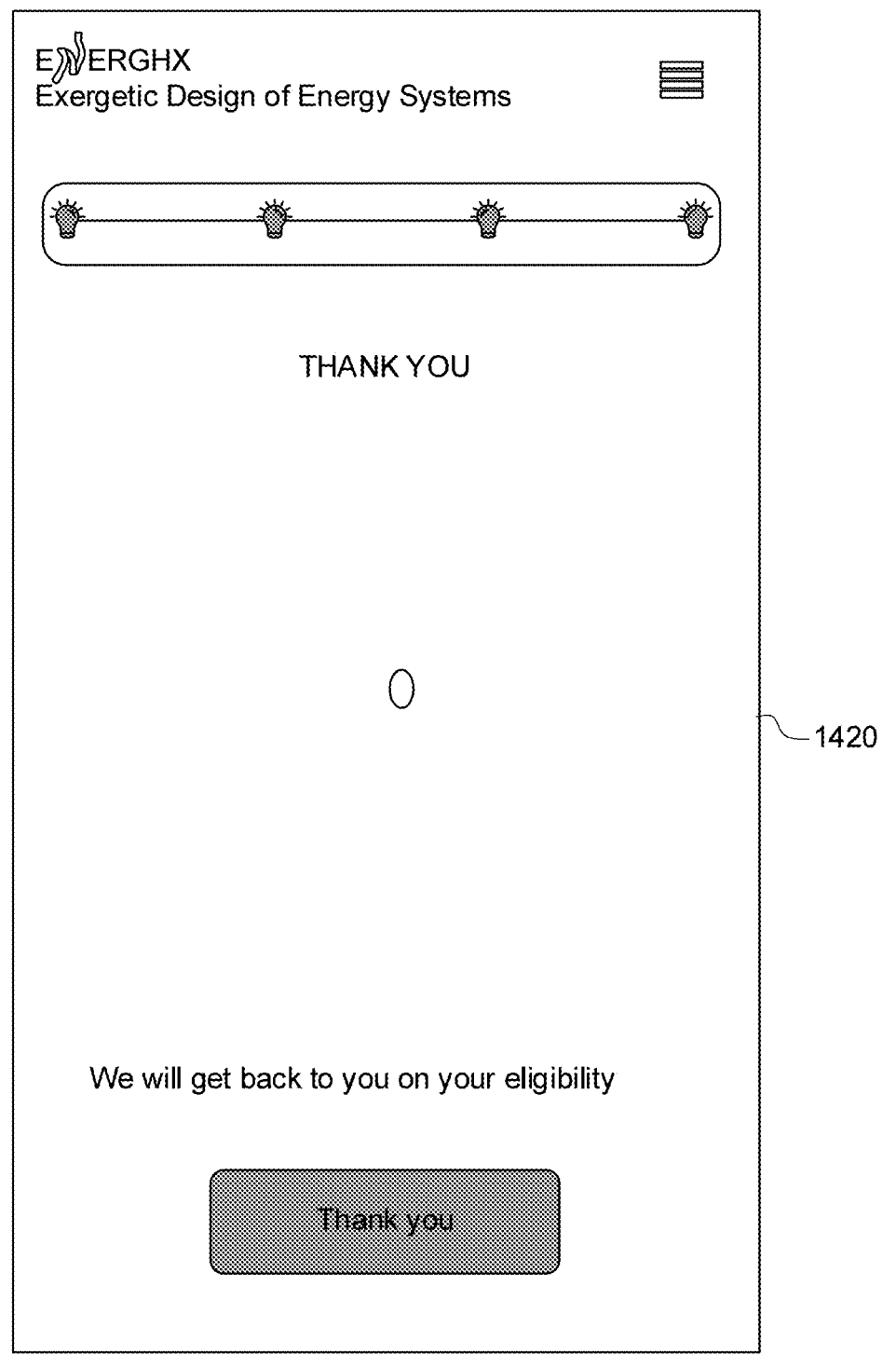

FIGS. 11A-11C illustrate visual graphics 1100a, 1100b, and 1100c that can be generated on a user device, such as the user device 102 or the user interface 306. The visual graphics 1100a, 1100b, and 1100c can correspond to an interactive setup function of the energy management system 100. As an example, the visual graphics 1100a, 1100b, and 1100c can correspond to a user setup and onboarding screen, a login screen, and a selection of user-type screen, respectively. For example, when the user 416 wishes to utilize the energy management system 100, the user 416 can open an application on a user device 102 and choose to either log in 1102 if they have an existing account on the application or sign up 1104 if they do not have an existing account on the application. The user 416 with an account can log in using an email address 1106 and a password 1108 used during their sign-up and access the energy management system 100 by clicking the login button 1110. Once logged in, the user can select their user type from the provided list of either an energy consumer 1112, an energy developer, 1114, or an energy server 1116.

FIGS. 12A-12G illustrate further visual graphics 1200*a*, 1200*b*, 1200*c*, 1200*d*, 1200*e*, 1200*f*, and 1200*g* that can be generated on the user device 102. The visual graphics 1200*a*, 1200*b*, 1200*c*, 1200*d*, 1200*e*, 1200*f*, and 1200*g* can correspond to interactive onboarding screens for the energy consumer type user. As an example, the visual graphics 1200*a*, 1200*b*, 1200*c*, 1200*d*, 1200*e*, 1200*f*, and 1200*g* can correspond to a sign-up eligibility screen, a personal information screen, a utility selection screen, a selected commodity screen, a utility information screen, a verify and submit screen, and a confirmation screen, respectively. For example, before continuing with the onboarding process, a user must acknowledge 1202 that they are eligible to utilize the system 100 as an energy consumer type user. Once the user 416 has verified that they are eligible, the user can input their personal information 1204, including details such as their name, gender, and contact information. Additionally, the user 416 may input their desired energy commodity 1206 and building type 1208 information from a drop-down menu. At 1200*c*, the user 416 may select a utility service 1210 and utility commodity 1212 from a drop-down menu. At 1200*d*, the user 416 may select a commodity 1214 from either natural gas or electricity. At 1200*e*, the user can confirm that they are authorized to make changes on the selected account and that they understand the price comparison sheet and disclosure statement 1216. Additionally, at 1200*e*, the user can input location information for the selected commodity 1218. At 1200*f*, the user can verify and submit their information 1220 by inputting their name and contact information. Finally, at 1200*g*, the user is notified that their onboarding process is complete and that they will be contacted with an update on their eligibility 1222.

FIGS. 13A-13E illustrate further visual graphics 1300*a*, 1300*b*, 1300*c*, 1300*d*, and 1300*e* that can be generated on the user device 102. The visual graphics 1300*a*, 1300*b*, 1300*c*, 1300*d*, and 1300*e* can correspond to interactive onboarding screens for the energy developer-type user. As an example, the visual graphics 1300*a*, 1300*b*, 1300*c*, 1300*d*, and 1300*e* correspond to a sign-up screen, an educational and professional qualification screen, a work experience screen, a verify and submit screen, and a confirmation screen, respectively. For example, a user can input their personal information 1302, such as their name, gender, and contact information. Additionally, a user can input their internship interest 1304 from a drop-down menu. At 1300*b*, a user can input their academic/educational qualifications 1306, professional qualifications 1307, location of professional practice 1309, and documented proof of their qualifications 1308 may be uploaded. At 1300*c*, a user can input their work experience 1310, including the name, location, title, and time period of the work engagement. Additionally, at 1300*c*, a user can input any related publication information 1312, and a list of references 1313. At 1300*d* a user can verify and submit their information 1314 by inputting their name and contact information. Additionally, the user must acknowledge the non-disclosure agreement and Ethics Policy documents 1316 by checking the boxes and continuing. Finally, at 1300*e*, the user is notified that their onboarding process is complete and that they will be contacted with an update on their eligibility 1318.

Figure 14A:
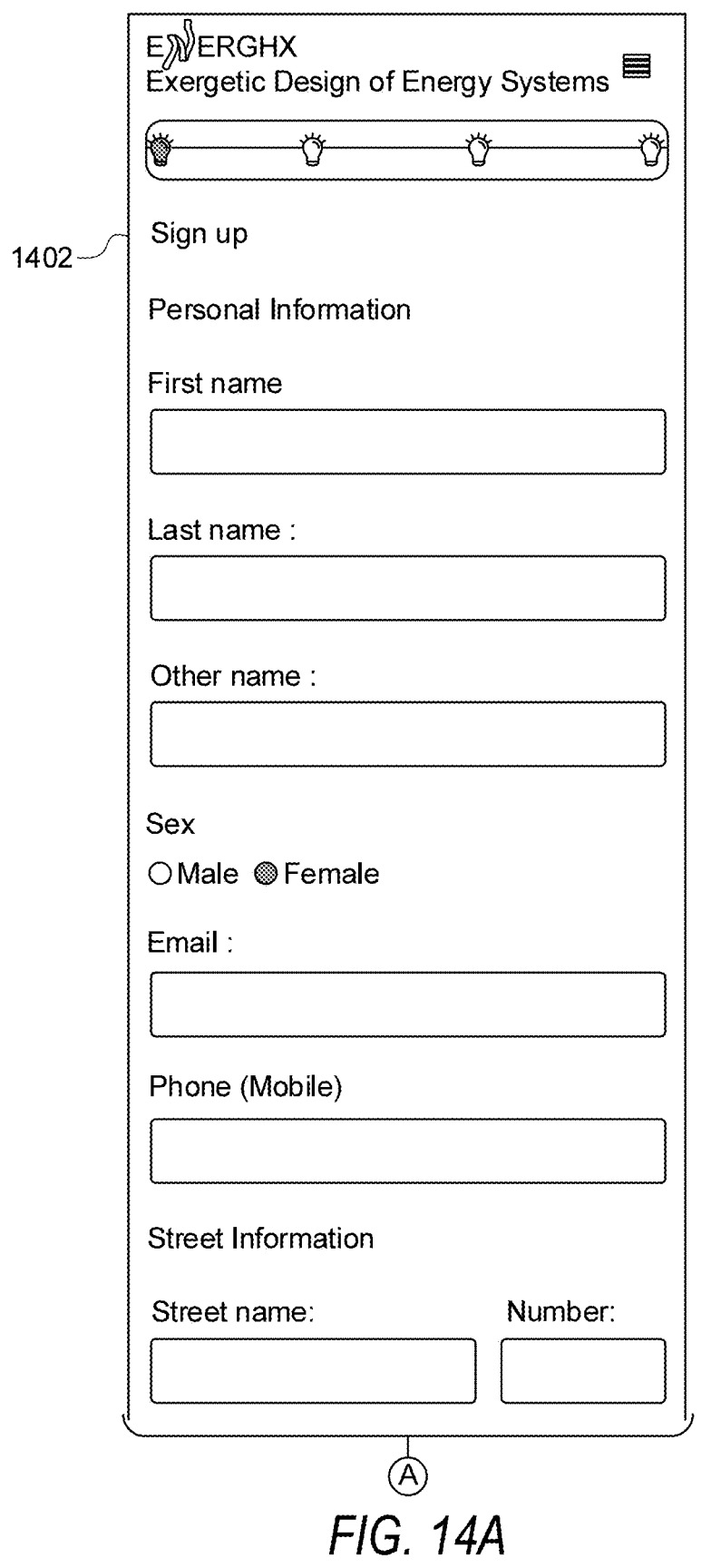

FIGS. 14A-14E illustrate further visual graphics 1400*a*, 1400*b*, 1400*c*, 1400*d*, and 1400*e* that can be generated on the user device 102. The visual graphics 1400*a*, 1400*b*, 1400*c*, 1400*d*, and 1400*e* can correspond to interactive onboarding screens for the energy server-type user. As an example, the visual graphics 1400*a*, 1400*b*, 1400*c*, 1400*d*, and 1400*e* can correspond to a sign-up screen, educational and professional qualification screen, work experience screen, verify and submit screen, and a confirmation screen, respectively. For example, a user can input their personal information 1402 including their name, gender, and contact information. Additionally, at 1400*a*, a user may select, from a drop-down menu, the type of enrollment 1404 they would like to proceed with. A user may also input a short biography describing their specialization 1405. At 1400*b*, a user can input their academic/educational qualifications 1406, professional qualifications 1407, location of professional practice 1409, and documented proof of their qualifications 1408 may be uploaded. At 1400*c*, a user can input their work experience 1410 including the name, location, title, and time period of the work engagement. Additionally, at 1400*c*, a user can input any related publication information 1412, and a list of references 1414. At 1400*d*, a user can verify and submit their information 1416 by inputting their name and contact information. Additionally, the user must acknowledge the non-disclosure agreements and Ethics Policy documents 1418 by checking the boxes and continuing. Finally, at 1400*e*, the user is notified that their onboarding process is complete and that they will be contacted with an update on their eligibility 1420.

A compact modeling of thermal comfort, indoor air quality, monitoring, and energy management supply service system in a built environment, through, for example, a web-based app, desktop software, and/or mobile software application, is provided. The methods, systems, and devices use a combination of a computational fluid dynamics (CFD) tool, a smart box for different energy management opportunities (EMO), and efficient energy auditing (EA) capabilities. The CFD tool is built into the described systems and software architectures and may be available for EMO and/or EA capabilities. The CFD tool may also be used for thermal comfort analysis and indoor air quality analysis.

It will be appreciated by those skilled in the art that while the system has been described above in connection with particular embodiments and examples, the system is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference as if each such patent or publication were individually incorporated by reference herein. Several features and advantages of the system are set forth in the following claims.

What is claimed is:

1. An energy management system designed to analyze energy demand and supply of at least one building on a single platform, the system comprising:

a user device;

a system component;

a controller in communication with the system component, wherein the controller includes a building energy audit and analysis level for an energy consumer-type user, an energy server-type user, and an energy developer-type user, an energy demand-supply management level for the interaction of an energy server-type user and energy developer-type user with a renewable energy project sizing, and a heat and mass balance simulation level for developer-type user, wherein at least one of the energy server-type user, or the energy developer-type user monitors the interaction of information on the single platform towards a net-zero energy management;

a system component interfacing the user device for engagement of energy consumer-type user, wherein the system component includes:

an energy appliance audit calculation module;

a cooling load calculation module;

an electric battery sizing and charging station analysis module;

solar photovoltaic sizing calculation module;

wind energy sizing calculation module; and biomass energy sizing calculation module;

a system component interfacing the user device for visualization of controller's requests and results, wherein the system component includes:

energy management opportunities dashboard, in terms of zero-emission ratios (availability, accessibility, and affordability), energy use intensity (EUI) of appliances, and thermal comfort and indoor air quality indices;

global optimization results dashboard;

energy service recommendations dashboard; and a system component interfacing the user device for onboarding of energy server-type user and energy developer-type user, wherein the system component includes:

an educational and professional screening portal;

a work experience screening portal; and an internship interest selector.

2. The energy management system of claim 1, wherein the building energy audit and analysis level comprises at least one of:

future models;

an appliance audit calculation, a cooling load calculation, and an electric vehicle battery system-sizing and an electric vehicle charging station, wherein the energy consumer-type user utilizes the building energy audit and analysis level to upload a combination of personal information, energy appliance information, and building's renewable energy supply potential information for energy profiling towards zero-emission ratio analysis by the system.

3. The energy management system of claim 1, wherein the energy demand-supply management level comprises at least one of:

energy management opportunities;

a solar photovoltaic sizing;

a wind turbine sizing; and a biomass plant sizing, wherein at least one combination or collaboration of the energy server-type user and the energy developer-type user access the energy demand-supply management level to upload all available renewable energy potential data in the building envelope to be analyzed by the system.

4. The energy management system of claim 1, wherein the heat and mass balance simulation level comprises at least one of:

a system design, a thermal comfort model, and an indoor air quality model, wherein the energy developer-type user accesses an energy-saving Non-Inverted Skew Upwind Scheme (NISUS)-based heat and mass balance simulation level to upload the thermal comfort and predicted mean vote (PMV) or the air quality index (AQI) data in the building envelope to be analyzed by the system.

5. The energy management system of claim 1, wherein the system further comprises a user interface configured to enable at least one combination or collaboration of the energy consumer-type user, the energy server-type user, and the energy developer-type user to communicate energy consumption and renewable energy supply data through at least one of the engagement system component or controller to be analyzed by the system.

6. The energy management system of claim 1, wherein the system further comprises an energy demand-supply result visualization to provide a visual of a net-zero performance, energy-management opportunities (EMO) of the building, and the eligibility of both energy server-type user and energy developer-type user.

7. The energy management system of claim 1, wherein the system further comprises an energy-saving compressed banded data (CBD) storage system, wherein the data storage system obtains and stores combined energy appliance and renewable energy potential data supplied by one or more of the energy consumer-type user, the energy server-type user, or the energy developer-type user during enrollment as auto-regulating drivers for a net-zero energy management system.

8. The energy management system of claim 7, wherein the system further comprises a data aggregator for non-automatic email service providers that communicate information to the data storage system.

9. The energy management system of claim 7, wherein the system further comprises a net-zero recommendation engine to provide recommendations based on collaborative filtering and control of the data stored in the data storage system.

10. The energy management system of claim 1, wherein the engagement system component is configured to manage a building envelope's energy demand and renewable energy supply on a single platform, the system further comprising:

at least one system component provided in a form of at least one building envelope;

an electric vehicle battery sizing and charging component provided in a form of energy appliance attached to one building envelope;

an onboarding user interface configured to provide eligibility update information on energy management practices in a deregulated energy market to eligible server-type user, who is licensed to render relevant technical service to consumer-type users;

the onboarding user interface configured to provide eligibility update information on energy management practices in a deregulated energy market to eligible developer-type user, who has received verifiable academic training in the engineering profession and eligible as engineer-in-training for professional services to consumer-type users; and a simulation controller provided in the form of a simulation manager configured to receive and process a data set received from the combined consumer-type user, server-type user, and developer-type user interfaces, wherein the combined consumer-type, server-type, and developer-type user interfaces are in communication with the controller via a network.

11. The energy management system of 10, wherein the consumer-type user interface, the server-type user interface, and the developer-type user interface are provided in the form of any one of mobile device and desktop device having an application.

12. The energy management system of 10, further comprising at least one of:

a consumer-type user engagement platform;

a consumer-type output visualization platform;

a server-type user information service platform;

a developer-type user information service platform;
a server-type user onboarding platform;
a developer-type user onboarding platform;
a local distribution company;
a data aggregator for non-automated email service provider;
a data store;
a user, wherein the user is a server, a developer, or a consumer;
a consumer-type user dashboard;
a server-type user dashboard;
a developer-type user dashboard;
a data storage having stored data; and
a recommendation engine;
wherein the recommendation engine provides recommendations based on collaborative interaction of the consumer-stored data and the expertise of an energy server-type user and an energy developer-type user.

13. The energy management system of 10, wherein the data set includes at least one of:
a solar photovoltaic voltage potentials,
a wind energy potentials,
a biomass energy potentials,
weather data from third-party,
energy benchmark values, electric vehicle's zero-emission ratio (ZER),
building net-zero ratio,
electricity price comparison and disclosure statement data from local utility,
natural gas price comparison and disclosure statement data from local utility,
renewable power system data,
geographical information system data, or
building codes, wherein the simulation controller is configured to process the data set through a software simulation engine algorithm and an audit software to provide a visualization of performance.

14. The energy management system of claim 12, wherein the consumer-type user result visualization platform includes at least one of
an energy benchmarking comparison,
an energy conservation measure,
electric vehicle's zero-emission ratio (ZER), in term of affordability, accessibility, and availability indices,
an energy efficiency rating and certification,
a solar energy sizing potential and rating,
a wind energy sizing potential and rating, and
a biomass energy sizing potential and rating.

* * * * *